(12) United States Patent
Kim et al.

(10) Patent No.: US 12,050,834 B2
(45) Date of Patent: Jul. 30, 2024

(54) FOLDABLE ELECTRONIC APPARATUS FOR PROCESSING SENSOR DATA ON BASIS OF CHANGE IN ANGLE, AND OPERATION METHOD THEREOF

(71) Applicant: Samsung Electronics Co., Ltd., Gyeonggi-do (KR)

(72) Inventors: Seungnyun Kim, Gyeonggi-do (KR); Yongsang Yun, Gyeonggi-do (KR); Jungeun Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 128 days.

(21) Appl. No.: 17/700,689

(22) Filed: Mar. 22, 2022

(65) Prior Publication Data

US 2022/0214852 A1 Jul. 7, 2022

Related U.S. Application Data

(63) Continuation of application No. PCT/KR2020/012846, filed on Sep. 23, 2020.

(30) Foreign Application Priority Data

Sep. 24, 2019 (KR) .................. 10-2019-0117423

(51) Int. Cl.
*G06F 3/14* (2006.01)
*G06F 1/16* (2006.01)
(Continued)

(52) U.S. Cl.
CPC .......... *G06F 3/1446* (2013.01); *G06F 1/1641* (2013.01); *G06F 1/1686* (2013.01); *H04N 23/63* (2023.01); *H04N 23/90* (2023.01)

(58) Field of Classification Search
CPC .... G06F 3/1446; G06F 1/1641; G06F 1/1686; G06F 3/1431; H04N 23/63
See application file for complete search history.

(56) References Cited

U.S. PATENT DOCUMENTS 10,194,089 B2 1/2019 Nash et al.
10,289,258 B2 * 5/2019 Lee .......................... G06F 3/048
(Continued)

FOREIGN PATENT DOCUMENTS

KR 10-2010-0082451 A 7/2010
KR 10-2014-0007660 A 1/2014
(Continued)

*Primary Examiner* — Nicholas G Giles
(74) *Attorney, Agent, or Firm* — Cha & Reiter, LLC

(57) ABSTRACT

Certain embodiments of the present invention relate to a foldable electronic device for processing data based on an angle change. The electronic device includes: a first housing in which first sensor is disposed; a second housing in which second sensor is disposed; a first display disposed in the first housing; a second display disposed in a space formed by the first housing and the second housing; and at least one sensor which detects the angle formed by the first housing and the second housing. The processor is configured to: detect a change in the angle between the first housing and the second housing; in response to the angle change, initiate an activation of the second sensor; use data collected from the first sensor until the activation of the second sensor is completed; and use data collected from the second sensor when the activation of the second sensor is completed.

20 Claims, 21 Drawing Sheets

(51) Int. Cl.
*H04N 23/63* (2023.01)
*H04N 23/90* (2023.01)

(56) References Cited

U.S. PATENT DOCUMENTS

| | | | |
|---|---|---|---|
| 11,317,021 B2* | 4/2022 | Wang | H05K 5/0017 |
| 2010/0182265 A1 | 7/2010 | Kim et al. | |
| 2014/0062856 A1 | 3/2014 | Lu et al. | |
| 2014/0375219 A1 | 12/2014 | Lee et al. | |
| 2016/0050408 A1 | 2/2016 | Lee et al. | |
| 2016/0085319 A1 | 3/2016 | Kim et al. | |
| 2016/0098063 A1 | 4/2016 | Lee et al. | |
| 2017/0293383 A1* | 10/2017 | Lee | G06F 1/1641 |
| 2021/0297590 A1* | 9/2021 | Wang | H04N 23/63 |

FOREIGN PATENT DOCUMENTS

| | | |
|---|---|---|
| KR | 10-2014-0147253 A | 12/2014 |
| KR | 10-2016-0021497 A | 2/2016 |
| KR | 10-2016-0033507 A | 3/2016 |
| KR | 10-2016-0040909 A | 4/2016 |
| KR | 10-2016-0092877 A | 8/2016 |

* cited by examiner

<Display And Transmit First Sensor Data>

<Process, Display, And Transmit First Sensor Data>

<Display And Transmit Second Sensor Data>

FOLDABLE ELECTRONIC APPARATUS FOR PROCESSING SENSOR DATA ON BASIS OF CHANGE IN ANGLE, AND OPERATION METHOD THEREOF

CROSS-REFERENCE TO RELATED APPLICATION(S)

This application is a continuation of International Application No. PCT/KR2020/012846, filed on Sep. 23, 2020, which claims priority to Korean Patent Application No. 10-2019-0117423, filed on Sep. 24, 2019 in the Korean Intellectual Property Office, the disclosures of which are herein incorporated by reference.

TECHNICAL FIELD

Certain embodiments of the disclosure relate to a foldable electronic device configured to process sensor data based on an angle change, and a method for operating the same.

BACKGROUND

The Internet content industry creates, publishes, aggregates, and curates its content to provide information and entertainment. In order to provide such various contents, electronic devices including a flexible display or multiple displays have been introduced. For example, some electronic devices may be implemented in a foldable type in order to enhance user's experience and functionality.

In the case of a foldable-type electronic device, the mechanical or physical structure of the electronic device may be changed by a user manipulation, e.g., a foldable-type electronic device may change from an unfolded state to a folded state or closed state.

A foldable electronic device can selectively change to an unfolded state and a folded state. Here, the shape of the electronic device may change from an unfolded state of the electronic device to a folded state, or vice versa. Thus, in operation, images captured by multiple cameras included in the electronic device in each state may be changed and displayed differently according to opened and closed state. Displayed images may differ depending on the availability of the multiple cameras included in the electronic device. For example, if the state of the electronic device changes from a folded state to an unfolded state or vice versa while a first application is being executed, the camera sensor interworking with the first application may be changed from a first camera sensor to a second camera sensor. Also, the electronic device may provide a first user interface to a first display by using the first camera sensor in the folded state, and after a change from the folded state to a closed state, may provide a second user interface to a second display by using the second camera sensor. If the sensor interworking with the first application is changed from the first sensor to the second sensor, the user of the electronic device may feel unfamiliar with the user interface of the first application due to different specifications of the first and second sensors.

Therefore, there is a need to provide a method and a device for processing data for display while sensing a folder state of an electronic device (for example, a change in angle defined by a display orientation or a mechanical element of the electronic device) in connection with a foldable-type electronic device.

SUMMARY

Technical problems to be solved by the disclosure are not limited to the above-mentioned technical problems, and other technical problems not mentioned herein will be clearly understood from the following description by those skilled in the art to which the disclosure pertains.

According to certain embodiments, an electronic device may include: a first housing in which at least one first sensor is disposed; a second housing in which at least one second sensor is disposed; a connecting part for foldably coupling the first housing and the second housing; a first display disposed in the first housing; a second display disposed in the second housing, the second display extending to the first housing over to a folding part defined by the connecting part; at least one sensor configured to detect an angle formed by the first housing and the second housing; and a processor operatively connected to the first display, the second display, the at least one sensor, the first sensor, and the second sensor, wherein the processor is configured to: use data collected from a first sensor for display on the first display; detect a change in the angle, via the at least one sensor, between the first housing and the second housing, in response to the angle change, initiating an activation of a second sensor, use data collected from a first sensor for display on the second display until the activation of the second sensor is completed, and use data collected from the second sensor for display when the activation of the second sensor is completed.

According to certain embodiments, an electronic device may include: a first display; a second display having a folding area; a first camera; a second camera; and a processor, wherein the processor is configured to determine a folding state of the second display, when the determined folding state corresponds to a designated first state, control the first display such that a first image generated based on image information acquired through the first camera is displayed through the first display, when the determined folding state corresponds to a designated second state, start activation of the second camera, before the activation of the second camera is completed, control the second display such that a second image generated based on the image information acquired through the first camera is displayed through the second display, and when the activation of the second camera is completed, control the second display such that a third image generated based on image information acquired through the second camera is displayed through the second display.

According to certain embodiments, a method for operating an electronic device may include sensing an angle change between a first housing and a second housing of the electronic device; activating a second sensor in response to the angle change; using data collected from the first sensor to display an image representative of a particular application until the activation of the second sensor is completed, and using data collected from the second sensor to display the image representative of the particular application when the activation of the second sensor is completed.

According to certain embodiments, if a change in mechanical state is sensed while an application is executed by using a first sensor in connection with a foldable-type or flexible-type electronic device, data collected at the timepoint at which the change in mechanical state is sensed and/or at a timepoint before the change in mechanical state may be sensed is processed until activation of a second sensor is completed, and the processed data may be used to provide a user interface, thereby minimizing the degree of unfamiliarity felt by the user.

DETAILED DESCRIPTION

Figure 1A:
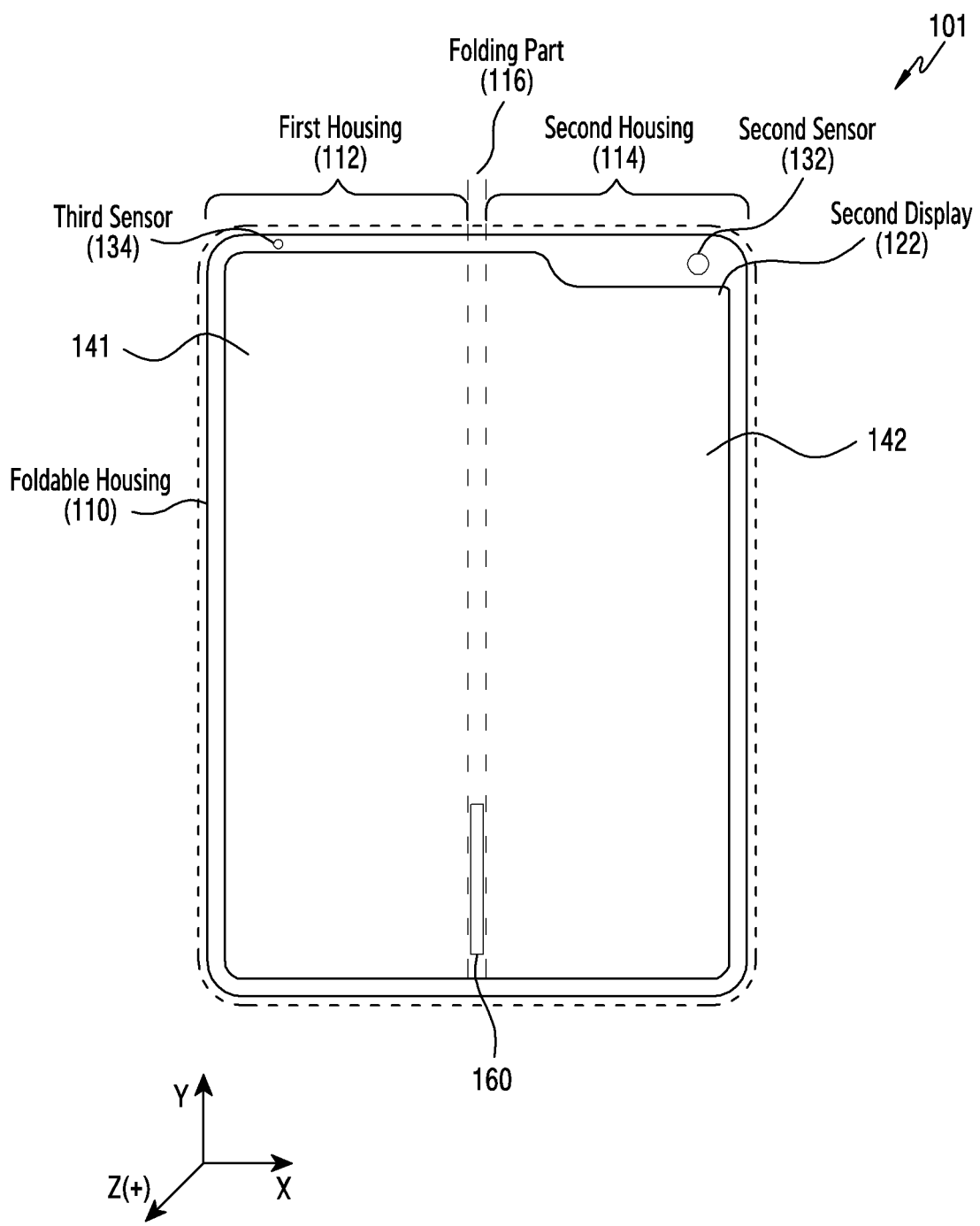
FIGS. 1A to 1D illustrate the unfolded state of an electronic device according to certain embodiments.

Hereinafter, certain embodiments of the present disclosure will be described with reference to the accompanying drawings. The embodiments and the terms used therein are not intended to limit the technology disclosed herein to specific implementation forms, and should be understood to include various modifications, equivalents, and/or alternatives to the corresponding embodiments. In describing the drawings, similar reference numerals may be used to designate similar constituent elements. A singular expression may include a plural expression unless they are definitely different in a context.

Figure 1B:
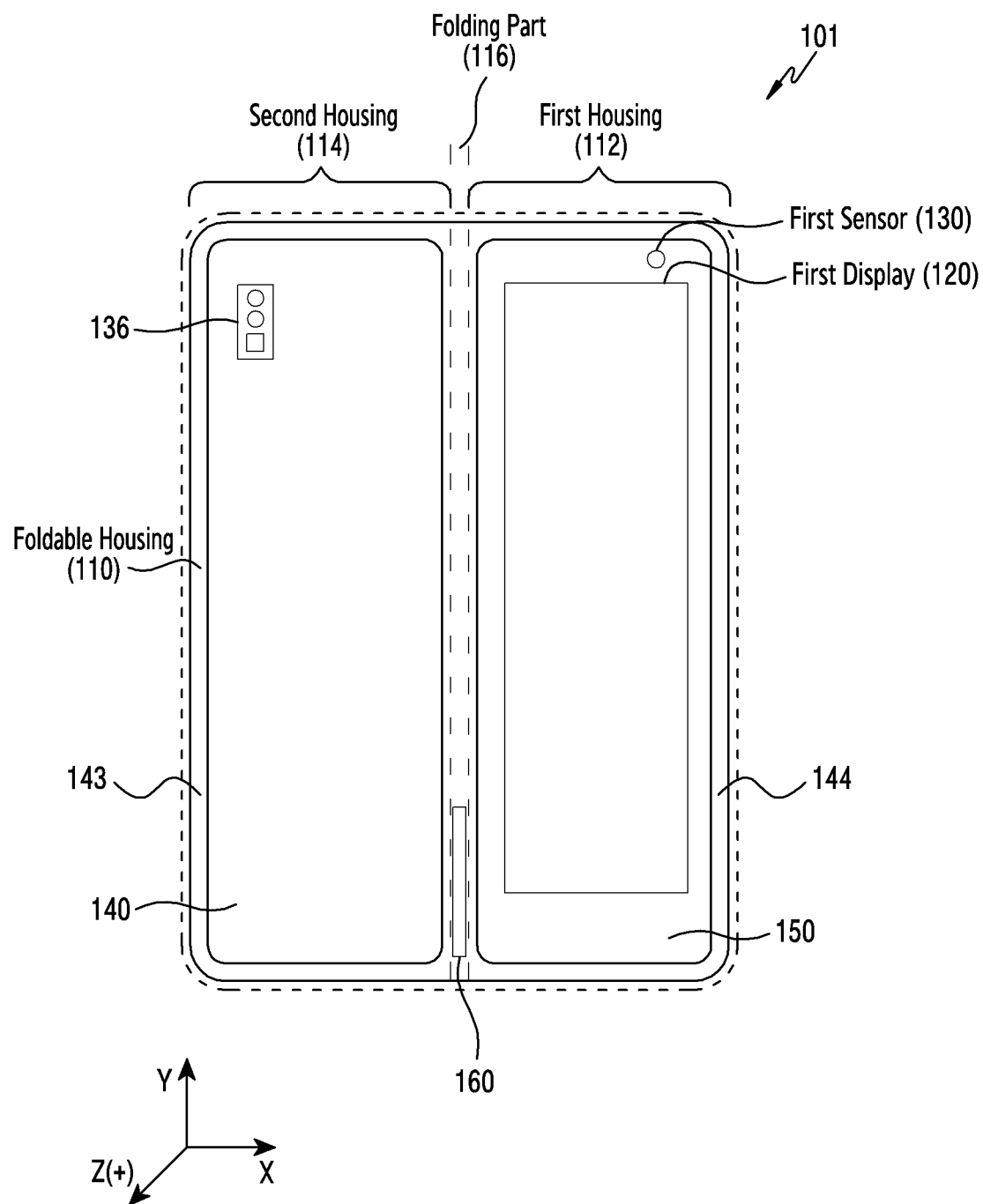
Figure 1C:
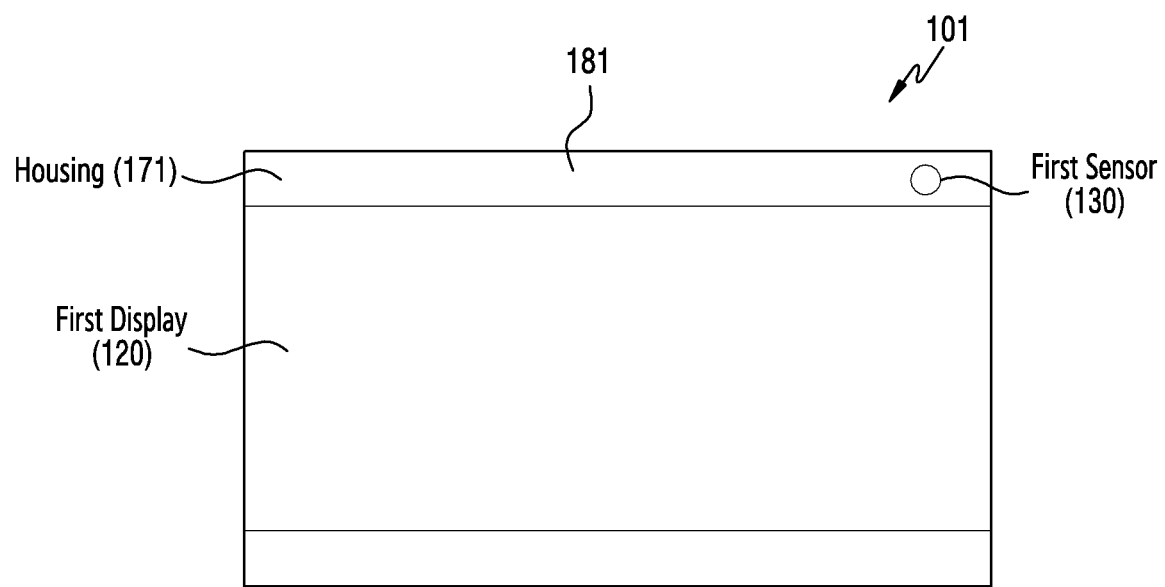
Figure 1D:
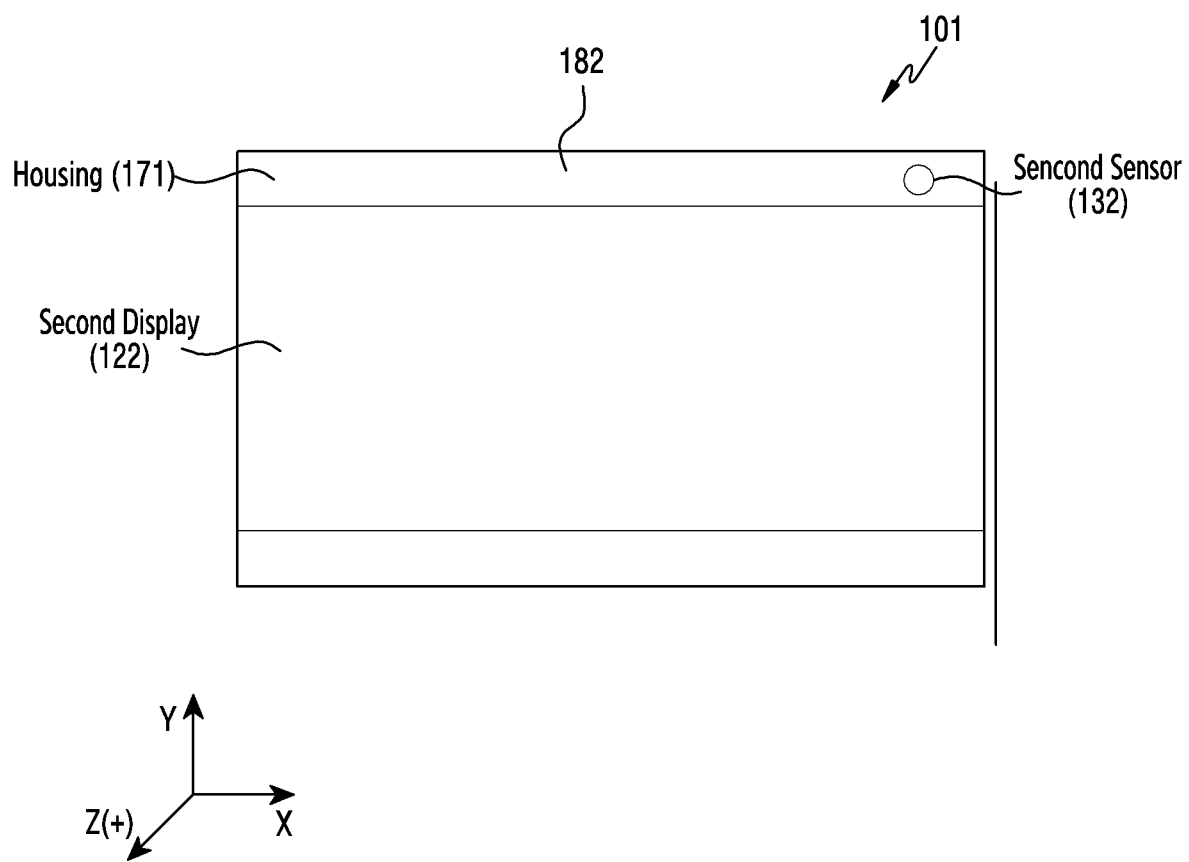

FIGS. 1A to 1D illustrate the unfolded state of an electronic device according to certain embodiments. FIG. 1A is a front view illustrating the unfolded state of a foldable-type electronic device according to certain embodiments, and FIG. 1B is a rear view illustrating the unfolded state of a foldable-type electronic device according to certain embodiments. FIG. 1C is a front view illustrating the unfolded state of a flexible-type electronic device according to certain embodiments, and FIG. 1D is a rear view illustrating the unfolded state of a flexible-type electronic device according to certain embodiments.

Referring to FIGS. 1A and 1B, an electronic device 101 according to certain embodiments may include a foldable housing 110, a folding part 116, a first display 120, a second display 122, a first sensor 130, a second sensor 132, a third sensor 134, and/or at least component 136. The first display 120 and/or the second display 122 may be flexible and/or foldable displays arranged in a space formed by the foldable housing 110.

According to certain embodiments, the foldable housing 110 may include a first housing 112 and a second housing 114. According to an embodiment, the electronic device 101 may include the first housing 112 and the second housing 114, and a housing including the first housing 112 and the second housing 114 may be called a foldable housing. The first housing 112 may include a first surface (or a first front surface (e.g., a surface facing the +Z-axis direction in FIG. 1A, or a surface facing the −Z-axis direction in FIG. 1B) 141, and a third surface (or a first rear surface (e.g., a surface facing the −Z-axis direction in FIG. 1A, or a surface facing the +Z-axis direction in FIG. 1B) 143 facing a direction opposite to the direction faced by the first surface 141. The second housing 114 may include a second surface (or a second front surface (e.g., a surface facing the +Z-axis direction in FIG. 1A, or a surface facing the −Z-axis direction in FIG. 1B) 142, and a fourth surface (or a second rear surface (e.g., a surface facing the −Z-axis direction in FIG. 1A, or a surface facing the +Z-axis direction in FIG. 1B) 144 facing a direction opposite to the direction faced by the second surface 142.

According to certain embodiments, the first housing 112 and the second housing 114 may be arranged at both ends of the folding part 116, and may be connected to each other via the folding part 116. For example, the folding part 116 may be coupled to each of the side surface of the first housing 112 and the side surface of the second housing 114, facing the side surface of the first housing 112, and thus may connect the first housing 112 to the second housing 114 such that the first housing 112 and the second housing 114 can pivot or rotate to a predetermined angle.

According to an embodiment, the electronic device 101 may include one housing in which the first housing 112 is integrated with the second housing 114. For example, the electronic device 101 may be formed in a flexible structure in which at least a part of the electronic device 101 can be bent. According to an embodiment, when the electronic device 101 includes one housing, the electronic device 101 may be folded by a user's selection, or a position, at which the electronic device 101 is bent, may be changed. According to an embodiment, when the electronic device 101 includes one housing, at least a partial area of the one housing may be formed of a bendable material. According to certain embodiments, the first display 120 may be disposed in a space formed by the first housing 112. At least part of the first display 120 may be visually exposed through a partial area of the third surface (or the first rear surface) of the first housing 112 or a partial area of a first rear cover 150.

According to certain embodiments, the second display 122 may be disposed in a space formed by the first housing 112 and the second housing 114 across the folding part 116. For example, the second display 122 may be installed to be supported by at least a part of the first housing 112 and at least a part of the second housing 114. In certain embodiments, the second display 122 may be disposed in a space formed in at least one surface of the first housing 112 and the second housing 114 across the folding part 116. According to certain embodiments, the first sensor 130 may be disposed in a space formed by the first housing 112. The first sensor 130 may be a sensor module disposed at the upper end of the area in which the first display 120 is disposed among the area of the third surface (or the first rear surface) of the first housing or the area of the first rear cover 150. The first sensor 130 may be included and embedded in the lower end portion of the first display 120. Further, the first sensor 130 may be mounted while being included in another subsidiary material included in at least a part of the first housing 112. The first sensor 130 may include at least one among at least one camera sensor or at least one ultra-wide band (UWB)

sensor. The UWB sensor is a sensor for supporting ultra-wide band communication using an occupied bandwidth equal to or greater than 500 MHz, and may be used to analyze transmission/reception patterns of an ultra-wide band wireless communication signal to sense an object (a thing) within a predetermined range or the movement of the object or recognize the object. The UWB sensor may transmit, based on UWB wireless technology, a signal by using a use frequency band of a UWB, and may sense and/or recognize an object or the movement of the object by using a method for acquiring a channel impulse response, based on the transmitted signal and a received signal which corresponds to the transmitted signal that is reflected by the object and returned. For example, the UWB wireless technology is a technology capable of accurately determining the position of a thing by using a very wide frequency band of several GHz in a baseband without using a radio frequency carrier. The UWB wireless technology may use a very narrow pulse of several nanoseconds or several picoseconds, and thus may share and use a frequency with an existing wireless system without causing mutual interference. The UWB wireless technology may be used without limitation in frequency. The UWB wireless technology may be used for a radar function such as measuring the distance between the electronic device 101 and a subject and/or tracking the position of the subject.

The first sensor 130 may further include another subsidiary material (e.g., a lens part (not shown)). The first sensor 130 may be called a first camera, and may include a sensor (e.g., an image sensing processor (ISP)) configured to acquire light outside the electronic device 101, and a lens part. The electronic device 101 may acquire an image by using the first camera, and may generate a first image that can be displayed on the first display 120. According to certain embodiments, the second sensor 132 may be disposed in a space formed by the second housing. The second sensor 132 may be a sensor module disposed in at least a partial area (e.g., an upper end area) of an area, in which the second display 122 is disposed, in the area of the second surface (or the second front surface) 142 of the second housing. According to an embodiment, the sensor module may be disposed in an opening formed in at least a partial area of the second display 122. The sensor module may be included in the second display 122. According to an embodiment, the sensor module may be disposed in one-side surface (e.g., the lower surface) of the second display 122, and may acquire information through at least a part (e.g., a translucent area) of the second display 122. The second sensor 132 may include at least one among at least one camera sensor or at least one UWB sensor. According to an embodiment, the second sensor 132 may be disposed at the lower end of the second display 122. The second sensor 132 may be disposed on a subsidiary material which is disposed in at least one side surface of the second housing 114 or in the second housing 114. The second sensor 132 may be included in at least a part of the second display 122. According to certain embodiments, the third sensor 134 may be disposed in a space formed by the first housing 112. The third sensor 134 may be a sensor module disposed in the upper end area of an area, in which the second display 122 is disposed, in the area of the first surface (or the first front surface) 141 of the first housing 112. The second sensor 132 may include at least one among at least one camera sensor or at least one UWB sensor. According to an embodiment, the third sensor 134 may be omitted without being provided in the first housing 112.

According to certain embodiments, the at least one component 136 may be disposed in a space formed by the second housing 114. The at least one component 136 may be a sensor module disposed in a partial area of the fourth surface (or the second rear surface) of the second housing 114 or a partial area of a second rear cover 140. For example, the at least one component 136 may include at least one among a fingerprint sensing sensor, a camera sensor, a proximity sensor, a UWB sensor, or a heart rate sensor.

The electronic device 101 according to certain embodiments may be folded about the folding part 116. For example, the folding part 116 may be disposed between the first housing 112 and the second housing 114 of the electronic device 101 so as to allow the electronic device 101 to be folded or bent to a predetermined angle. According to certain embodiments, the first housing 112 may be connected to the second housing 114 through the folding part 116, and may rotate about the folding part 116. According to certain embodiments, the second housing 114 may be connected to the first housing 112 through the folding part 116, and may rotate about the folding part 116. The housing 112 and the second housing 114 may be folded to face each other by rotating about the folding part 116. The first housing 112 and the second housing 114 may substantially lie one upon another or overlap each other. In operation, the first housing 112 and the second housing 114 may be folded by rotating about the folding part 116 such that the first surface 141 of the first housing 112 faces the second surface 142 of the second housing 114 or such that the third surface 143 of the first housing 112 faces the fourth surface 144 of the second housing 114. According to an embodiment, the electronic device 101 may include multiple folding parts 116. When the electronic device 101 includes two folding parts 116, the electronic device 101 may include a first housing, a second housing, and a third housing, wherein a first folding part may be disposed between the first housing and the second housing, and a second folding part may be disposed between the second housing and the third housing. According to an embodiment, without separately including a folding part, the electronic device 101 may include an integrated flexible housing in which the first housing 112 is integrated with the second housing 114. When the electronic device 101 includes the integrated flexible housing, at least a part of the electronic device 101 may be configured to be bendable. Here, the decision to switch a sensor may be determined with reference to the bendable part. The second display 122 may be folded to a predetermined angle, based on an angle formed by the first housing 112 and the second housing 114. Also, the second display 122 may be directly formed in the electronic device 101 without a structure of the first housing 112 or the second housing 114. Here, the electronic device 101 may determine the degree of folding of the second display 122 itself.

Referring to FIGS. 1C and 1D, the electronic device 101 according to certain embodiments may include a housing 171, the first display 120, the second display 122, the first sensor 130, and the second sensor 132.

According to certain embodiments, the housing 171 may include a first surface (or a front surface (e.g., a surface facing the +Z-axis direction in FIG. 1C, or a surface facing the −Z-axis direction in FIG. 1D)) 181, and a second surface (or a rear surface (e.g., a surface facing the +Z-axis direction in FIG. 1D, or a surface facing the −Z-axis direction in FIG. 1C)) 182 facing a direction opposite to the direction faced by the first surface 181). The housing 171 may further include a subsidiary material (not shown) configured in various structures. For example, the housing 171 may further include a slot (not shown) disposed on the left or right surface of the first surface 181. The slot may be configured such that the first display 120 and the second display 122 are at least partially inserted into or withdrawn out of the housing therethrough.

According to certain embodiments, the first display 120 may be disposed to be visually exposed through at least a partial area of the first surface 181 of the housing 171, and the second display 122 may be disposed to be visually exposed through at least a partial area of the second surface 182 of the housing 171. The first display 120 and the second display 122 may be flexible and/or foldable displays capable of being bent or folded in various forms. According to an embodiment, at least a part of the first display 120 and/or at least a part of the second display 122 may be received in the slot of the housing 171 while being curved or bent.

According to certain embodiments, the first sensor 130 may be disposed in a space formed by the first surface 181 of the housing 171, and the second sensor 132 may be disposed in a space formed by the second surface 182 of the housing 171. According to an embodiment, the first sensor 130 and/or the second sensor 132 may be mounted while being included in another subsidiary material included in at least a part of the housing 171. The first sensor 130 and/or the second sensor 132 may include at least one among at least one camera sensor or at least one UWB sensor. According to an embodiment, the first sensor 130 may be configured to be at least partially similar to the first sensor 130 in FIG. 1B, and the second sensor 132 may be configured to be at least partially similar to the second sensor 132 in FIG. 1A.

According to certain embodiments, the electronic device 101 as illustrated in FIGS. 1A to 1D may sense a change in the state of the electronic device 101, and may perform an operation corresponding to the sensed state status or change. The state of the electronic device 101 may be divided into a closed state, a folded state (or a partial open state), and an unfolded state (or a full open state). Hereinafter, in certain embodiments of the disclosure, the opening state of the electronic device 101 will be described while being divided into a closed state, a folded state, and an unfolded state. However, certain embodiments of the disclosure will not be limited thereto. For example, the state of the electronic device 101 may be further subdivided and defined based on an angle formed by a mechanism or a display of the electronic device 101.

According to certain embodiments, the electronic device 101 in FIGS. 1A to 1D may be in a closed state by the folding part 120 disposed between the first housing 112 and the second housing 114 or by folding of the second display 122. When the electronic device 101 is in the closed state, the first surface 141 of the first housing 112 and the second surface 142 of the second housing 114 may face each other, and may be parallel to each other. The closed state may indicate a state in which the second display 122 is hidden within a user's field of view (or angle of view) toward the front surface of the electronic device 101. When the electronic device 101 is in the closed state (e.g., a fully folded state), the user may not view the second display 122 of the electronic device 101 in all directions of the electronic device 101, and may view only the first display 120 of the electronic device 101 and/or the fourth surface (the second rear surface) 144 of the second housing 114. According to certain embodiments, the closed state may indicate a state in which the first display 120 is included within the user's field of view toward the front surface of the electronic device 101 and the second display 122 is hidden. When the electronic device 101 is in the closed state, the angle between the first surface 141 of the first housing 112 and the second surface 142 of the second housing 114 may be equal to or smaller than a first angle.

According to an embodiment, the closed state may be expressed by the folding state of the second display 122 of the electronic device 101. For example, when at least a part of the second display 120 is folded to a predetermined angle, the folding state of the second display 122 may be determined to be a designated first state (e.g., a fully folded state). When the folding state of the second display 122 is the designated first state, the electronic device 101 may provide information (e.g., image information) acquired through a first sensor (a first camera) to a user through the first display 120. According to an embodiment, when the folding state of the second display is the designated first state, the user may not view the second display 122 from all directions of the electronic device 101, and may view only the first display 120. When the folding state of the second display 122 is the designated first state, the electronic device 101 may display, through the first display 120, an application executed in the electronic device 101.

According to certain embodiments, the electronic device 101 may be in a folded (folded-in) state (or a partial open state) by the folding part 116 between the first housing 112 and the second housing 114 or by partial folding of the second display 122. When the electronic device 101 is in the folded state, the angle between the first surface 141 of the first housing 112 and the second surface 142 of the second housing 114 may form an angle within a designated range. When the electronic device 101 is in the folded state, within the user's field of view toward the front surface of the electronic device 101 according to the direction of the electronic device 101, the entire area of the second display 122 may be included, at least a part of the right area of the second display 122 and the first display 120 may be included, or at least a part of the left area of the second display 122 and the fourth surface (or the second rear surface) 144 of the second housing 114 may be included. For example, when the electronic device 101 is in the folded state, the angle between the first surface 141 of the first housing 112 and the second surface 142 of the second housing 114 may be larger than the first angle and smaller than a second angle. At least one among the designated range, the first angle, or the second angle may be configured and/or changed by a designer and/or the user. According to certain embodiments, in the electronic device 101, the folding state of at least a part of the second display 122 may be a partial open state. When the folding state of the second display 122 is the partial open state, an angle formed at the time of folding of the second display 122 (or an angle by which the second display 122 is folded) may form an angle within the designated range. When at least a part of the second display 122 is in the partial open state, within the user's field of view, the entire area of the second display 122 may be included, or at least a part of the right area of the second display 122 and the first display 120 may be included. According to certain embodiments, the electronic device 101 may be in an unfolded (folded-out) state (or a full open state) by the folding part 116 between the first housing 112 and the second housing 114 or by unfolding of the second display 122. When the electronic device 101 is in the unfolded state, the first surface 141 of the first housing 112 and the second surface 142 of the second housing 114 may be substantially flush with each other. When the electronic device 101 is in the unfolded state, the entire area of the second display 122 may be included within the user's field of view (or angle of view) toward the front surface of the electronic device 101. For example, when the electronic device 101 is in the unfolded state, the angle between the first surface 141 of the first housing 112 and the second surface 142 of the second housing 114 may be larger than the second angle and equal to or smaller than a third angle.

According to certain embodiments, the electronic device 101 may determine, based on the degree of folding of the second display 122, that the folding state of the second display is an unfolded (folded-out) state (or a full open state). When the second display 122 is in the unfolded state, the second display 122 may be unfolded to be substantially flat. When the second display 122 is in the unfolded state, the entire area of the second display 122 may be included within the user's field of view (or angle of view) toward the front surface of the electronic device 101. The user may view the entire area of the second display 122.

According to certain embodiments, a method for determining the folding state of the second display 122 may be variously configured. The method for determining the folding state of the second display 122 is not limited to the content described in the disclosure, and the folding state of the second display 122 may be determined through various sensors. For example, at least one angle sensing sensor may be included in at least a part of the second display 122. The angle sensing sensor may measure a change in an angle caused by folding of at least one side surface of the second display 122. At least a part of the second display 122 may include at least one Hall sensor, and the unfolding or folding state may be determined through magnetic information sensed by the Hall sensor.

According to certain embodiments, the folding part 116 may include an angle sensing sensor 160. For example, the angle sensing sensor 160 may be a degree sensor capable of sensing an angle formed by the first housing 112 and the second housing 114.

According to certain embodiments, at least one state sensing sensor may be disposed in each of the first housing 112 and the second housing 114. For example, a first state sensing sensor may be disposed in the first housing 112, and a second state sensing sensor may be disposed in the second housing 114. The first state sensing sensor and the second state sensing sensor may be sensors for acquiring information about the angle between the first housing 112 and the second housing 114. The first and second state sensing sensors may include at least one among, for example, a gyro sensor, a distance sensor, or a strain sensor.

According to certain embodiments, the folding part 116 may include a hinge (not shown) and a hinge cover, and the hinge may be covered by the hinge cover. The folding part 116 may be formed as a connection part (or a connector) including another mechanical element, in addition to the hinge.

According to certain embodiments, the first display 120 or the second display 122 may include a touch sensor (not shown) capable of detecting a touch input. The first display 120 or the second display 122 may be formed as an integrated touch screen included therein. When the first display 120 or the second display 122 is formed as a touch screen, the touch sensor may be disposed on the display or may be disposed beneath the display.

According to certain embodiments, the electronic device 101 may additionally include at least one sensor in addition to the above-described sensors (e.g., the first sensor 130, the second sensor 132, the third sensor 134, and the sensor included in the at least one component 136). The additionally included sensors may be arranged to be spaced a designated distance apart from at least one among the first sensor 130, the second sensor 132, the third sensor 134, and the sensor included in the at least one component 136.

FIGS. 1A to 1D, described above, are merely exemplary illustrations to help understanding, and certain embodiments of the disclosure will not be limited to the structure as described above. For example, certain embodiments of the disclosure may be applied to electronic devices having various structures capable of being folded, curved, or bent by a user. In another example, certain embodiments of the disclosure may be applied to multiple electronic devices physically and/or logically connected to each other and configured to perform a folding operation.

Figure 2:
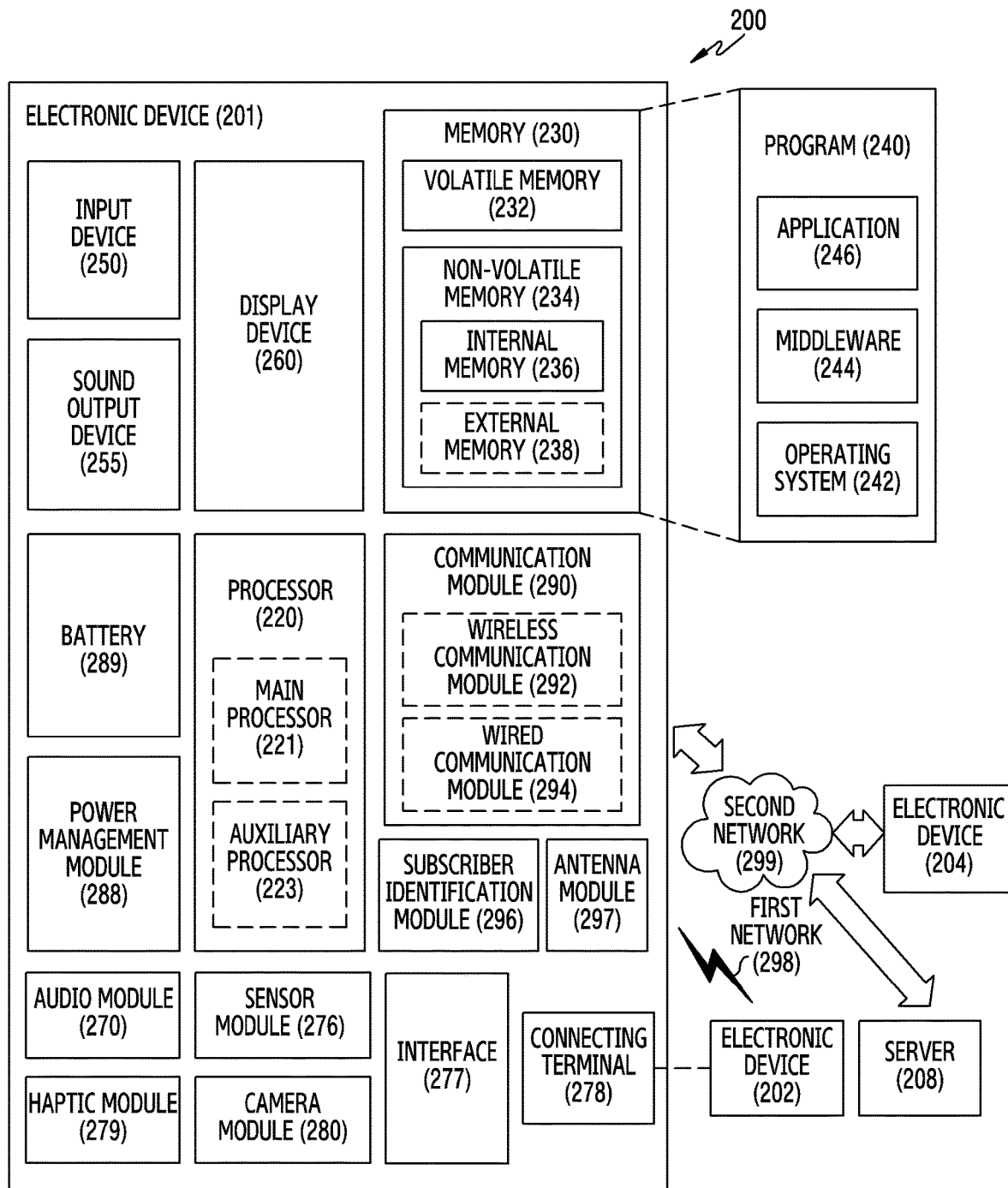
FIG. 2 is a block diagram of an electronic device in a network environment according to certain embodiments.

FIG. 2 is a block diagram of an electronic device 201 in a network environment 200 according to certain embodiments. The electronic device 201 in FIG. 2 may be the electronic device 101 in FIG. 1.

Referring to FIG. 2, the electronic device 201 in the network environment 200 may communicate with an electronic device 202 via a first network 298 (e.g., a short-range wireless communication network), or an electronic device 204 or a server 208 via a second network 299 (e.g., a long-range wireless communication network). According to an embodiment, the electronic device 201 may communicate with the electronic device 204 via the server 208. According to an embodiment, the electronic device 201 may include a processor 220, memory 230, an input device 250, a sound output device 255, a display device 260, an audio module 270, a sensor module 276, an interface 277, a haptic module 279, a camera module 280, a power management module 288, a battery 289, a communication module 290, a subscriber identification module (SIM) 296, or an antenna module 297. In some embodiments, at least one (e.g., the display device 260 or the camera module 280) of the components may be omitted from the electronic device 201, or one or more other components may be added in the electronic device 201. In some embodiments, some of the components may be implemented as single integrated circuitry. For example, the sensor module 276 (e.g., a fingerprint sensor, an iris sensor, or an illuminance sensor) may be implemented as embedded in the display device 260 (e.g., a display).

The processor 220 may execute, for example, software (e.g., a program 240) to control at least one other component (e.g., a hardware or software component) of the electronic device 201 coupled with the processor 220, and may perform various data processing or computation. According to one embodiment, as at least part of the data processing or computation, the processor 220 may load a command or data received from another component (e.g., the sensor module 276 or the communication module 290) in volatile memory 232, process the command or the data stored in the volatile memory 232, and store resulting data in non-volatile memory 234. According to an embodiment, the processor 220 may include a main processor 221 (e.g., a central processing unit (CPU) or an application processor (AP)), and an auxiliary processor 223 (e.g., a graphics processing unit (GPU), an image signal processor (ISP), a sensor hub processor, or a communication processor (CP)) that is operable independently from, or in conjunction with, the main processor 221. Additionally or alternatively, the auxiliary processor 223 may be adapted to consume less power than the main processor 221, or to be specific to a specified function. The auxiliary processor 223 may be implemented as separate from, or as part of the main processor 221.

The auxiliary processor 223 may control at least some of functions or states related to at least one component (e.g., the display device 260, the sensor module 276, or the communication module 290) among the components of the electronic device 201, instead of the main processor 221 while the main processor 221 is in an inactive (e.g., sleep) state, or together with the main processor 221 while the main processor 221 is in an active state (e.g., executing an application). According to an embodiment, the auxiliary processor 223 (e.g., an image signal processor or a communication processor) may be implemented as part of another component (e.g., the camera module 280 or the communication module 290) functionally related to the auxiliary processor 223.

The memory 230 may store various data used by at least one component (e.g., the processor 220 or the sensor module 276) of the electronic device 201. The various data may include, for example, software (e.g., the program 240) and input data or output data for a command related thereto. The memory 230 may include the volatile memory 232 or the non-volatile memory 234.

The program 240 may be stored in the memory 230 as software, and may include, for example, an operating system (OS) 242, middleware 244, or an application 246.

The input device 250 may receive a command or data to be used by other component (e.g., the processor 220) of the electronic device 201, from the outside (e.g., a user) of the electronic device 201. The input device 250 may include, for example, a microphone, a mouse, a keyboard, or a digital pen (e.g., a stylus pen).

The sound output device 255 may output sound signals to the outside of the electronic device 201. The sound output device 255 may include, for example, a speaker or a receiver. The speaker may be used for general purposes, such as playing multimedia or playing record, and the receiver may be used for an incoming call. According to an embodiment, the receiver may be implemented as separate from, or as part of the speaker.

The display device 260 may visually provide information to the outside (e.g., a user) of the electronic device 201. The display device 260 may include, for example, a display, a hologram device, or a projector and control circuitry to control a corresponding one of the display, hologram device, and projector. According to an embodiment, the display device 260 may include touch circuitry adapted to detect a touch, or sensor circuitry (e.g., a pressure sensor) adapted to measure the intensity of force incurred by the touch.

The audio module 270 may convert a sound into an electrical signal and vice versa. According to an embodiment, the audio module 270 may obtain the sound via the input device 250, or output the sound via the sound output device 255 or a headphone of an external electronic device (e.g., an electronic device 202) directly (e.g., wiredly) or wirelessly coupled with the electronic device 201.

The sensor module 276 may detect an operational state (e.g., power or temperature) of the electronic device 201 or an environmental state (e.g., a state of a user) external to the electronic device 201, and then generate an electrical signal or data value corresponding to the detected state. According to an embodiment, the sensor module 276 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 277 may support one or more specified protocols to be used for the electronic device 201 to be coupled with the external electronic device (e.g., the electronic device 202) directly (e.g., wiredly) or wirelessly. According to an embodiment, the interface 277 may include, for example, a high definition multimedia interface (HDMI), a universal serial bus (USB) interface, a secure digital (SD) card interface, or an audio interface.

A connecting terminal 278 may include a connector via which the electronic device 201 may be physically connected with the external electronic device (e.g., the electronic device 202). According to an embodiment, the connecting terminal 278 may include, for example, a HDMI connector, a USB connector, a SD card connector, or an audio connector (e.g., a headphone connector).

The haptic module 279 may convert an electrical signal into a mechanical stimulus (e.g., a vibration or a movement) or electrical stimulus which may be recognized by a user via his tactile sensation or kinesthetic sensation. According to an embodiment, the haptic module 279 may include, for example, a motor, a piezoelectric element, or an electric stimulator.

The camera module 280 may capture a still image or moving images. According to an embodiment, the camera module 280 may include one or more lenses, image sensors, image signal processors, or flashes.

The power management module 288 may manage power supplied to the electronic device 201. According to one embodiment, the power management module 288 may be implemented as at least part of, for example, a power management integrated circuit (PMIC).

The battery 289 may supply power to at least one component of the electronic device 201. According to an embodiment, the battery 289 may include, for example, a primary cell which is not rechargeable, a secondary cell which is rechargeable, or a fuel cell.

The communication module 290 may support establishing a direct (e.g., wired) communication channel or a wireless communication channel between the electronic device 201 and the external electronic device (e.g., the electronic device 202, the electronic device 204, or the server 208) and performing communication via the established communication channel. The communication module 290 may include one or more communication processors that are operable independently from the processor 220 (e.g., the application processor (AP)) and supports a direct (e.g., wired) communication or a wireless communication. According to an embodiment, the communication module 290 may include a wireless communication module 292 (e.g., a cellular communication module, a short-range wireless communication module, or a global navigation satellite system (GNSS) communication module) or a wired communication module 294 (e.g., a local area network (LAN) communication module or a power line communication (PLC) module). A corresponding one of these communication modules may communicate with the external electronic device via the first network 298 (e.g., a short-range communication network, such as Bluetooth™, wireless-fidelity (Wi-Fi) direct, or infrared data association (IrDA)) or the second network 299 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 292 may identify and authenticate the electronic device 201 in a communication network, such as the first network 298 or the second network 299, using subscriber information (e.g., international mobile subscriber identity (IMSI)) stored in the subscriber identification module 296.

The antenna module 297 may transmit or receive a signal or power to or from the outside (e.g., the external electronic device) of the electronic device 201. According to an embodiment, the antenna module 297 may include an antenna including a radiating element composed of a conductive material or a conductive pattern formed in or on a substrate (e.g., PCB). According to an embodiment, the antenna module 297 may include a plurality of antennas. In such a case, at least one antenna appropriate for a communication scheme used in the communication network, such as the first network 298 or the second network 299, may be selected, for example, by the communication module 290 (e.g., the wireless communication module 292) from the plurality of antennas. The signal or the power may then be transmitted or received between the communication module 290 and the external electronic device via the selected at least one antenna. According to an embodiment, another component (e.g., a radio frequency integrated circuit (RFIC)) other than the radiating element may be additionally formed as part of the antenna module 297.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 201 and the external electronic device 204 via the server 208 coupled with the second network 299. Each of the electronic devices 202 and 204 may be a device of a same type as, or a different type, from the electronic device 201. According to an embodiment, all or some of operations to be executed at the electronic device 201 may be executed at one or more of the external electronic devices 202, 204, or 208. For example, if the electronic device 201 should perform a function or a service automatically, or in response to a request from a user or another device, the electronic device 201, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 201. The electronic device 201 may provide the outcome, with or without further processing of the outcome, as at least part of a reply to the request. To that end, a cloud computing, distributed computing, or client-server computing technology may be used, for example.

According to certain embodiments, the processor 220 may sense a change in the angle between a first housing (e.g., the first housing 112 in FIG. 1A) and a second housing (e.g., the second housing 114 in FIG. 1A) according to a change in the mechanical state of the electronic device 201.

According to an embodiment, the processor 220 may sense a state in which at least one side surface of a second display (e.g., the second display 122 in FIG. 1A or 1D) included in the electronic device 201 is being folded. According to an embodiment, the processor 220 may determine, based on data received from the sensor module 276, the folding state of the second display 122 according to the degree of folding of the second display 122. The processor 220 may sense that the folding angle of the second display 122, which is folded with reference to one side surface thereof, is changed. The processor 220 may sense a change in state of the electronic device 101 based on the change in angle of the second display 122. For example, the processor 20 may sense, based on the change in an angle of the second display 122, at least one among a change from a closed state to a folded state, a change from a folded state to an unfolded state, a change from an unfolded state to a folded state, or a change from a folded state to a closed state.

According to an embodiment, the processor 220 may sense, based on data received from the sensor module 276, that the angle between the first housing 112 and the second housing 114, or the folding state of the second display 122 is changed. The processor 220 may determine (calculate) the angle between the first surface 141 of the first housing 112 and the second surface 142 of the second housing 114, or the folding angle of the second display 122, based on at least one among an angle sensor, a strain sensor, a distance sensor, a gyroscope sensor, or a degree sensor, which is included in the electronic device 201.

According to certain embodiments, the processor 220 may sense, while providing a user interface of a first application operating in conjunction with at least one sensor and a display, the occurrence of an event for changing the sensor and the display based on a change in the angle between the first housing 112 and the second housing 114, or an angle change sensed according to a change in the folding state of the second display 122. For example, the sensor and the display change event may include at least one among an event for changing at least one sensor and a display, which are linked with the first application, or an event for changing a display while additionally linking at least one other sensor with the first application. The first application operating in conjunction with the at least one sensor or the display may include an application for providing a user interface by using data acquired from the at least one sensor, or an application for transmitting the data acquired from the at least one sensor to at least one other electronic device. For example, the first application may include at least one among a camera application, a video call application, an object sensing application, or an object recognition application. It should be noted that the mentioned applications are merely exemplified to help understanding, and certain embodiments of the disclosure will not be limited thereto. Providing the user interface of the first application may include providing, through a corresponding display, a user interface including an image generated based on the data acquired from the at least one sensor.

According to an embodiment, while providing the user interface of the first application operating in conjunction with the at least one sensor and the display, when it is sensed that the angle between the first housing 112 and the second housing 114 is changed from an angle within a designated angle range to an angle outside the designated angle range, or when it is sensed that at least a part of the second display 122 has been folded to a predetermined angle, the processor 220 may determine that the sensor and the display change event has occurred. The sensor and the display change event may include at least one among an event for changing at least one sensor and a display, which are linked with an application capable of using a first display, or an event for changing a display while additionally linking at least one other sensor with the application.

According to certain embodiments, the processor 220 may sense the event for changing the sensor and the display, and may control the activation state of sensors, based on the sensed event. When a sensor change is needed based on the event for changing the sensor and the display, the processor 220 may control the sensor module 276 and/or the camera module 280 such that at least one other sensor to be linked with the first application is activated, and at least one sensor linked with the first application switches from an activated state to a deactivated state.

According to an embodiment, when sensor addition is needed based on the event for changing the sensor and the display, the processor 220 may control the sensor module 276 and/or the camera module 280 such that at least one other sensor to be additionally linked with the first application switches from a deactivated state to an activated state and at least one sensor linked with the first application maintains an activated state, and may provide information to a user by using data acquired by the additionally activated at least one other sensor and data acquired by the previously activated at least one sensor together.

According to certain embodiments, when the sensor and display change event occurs, from the starting of the activation of the at least one other sensor until the activation of the at least one other sensor is completed, the processor 220 may process data collected by the previously activated at least one sensor and may use the processed data as data usable in the first application. For example, until the activation of the at least one other sensor is completed, it is impossible to collect data from the at least one other sensor, and thus the processor 220 may process data previously collected by the previously activated at least one sensor and/or data collected at the time of occurrence of the sensor and display change event into data usable in the first application. The processor 220 may control the communication module 290 to transmit the processed data as data for the first application to another electronic device, or may control the display device 260 to display the processed data as data for the first application.

According to certain embodiments, the processor 220 may use specification information of a sensor and a display at the time of data processing. For example, the processor 220 may use at least one of specification information of a previously activated sensor and/or display, and specification information of an additionally activated sensor and/or display to process data collected by the previously activated sensor (e.g., may perform object size adjustment, object position adjustment, focusing, screen brightness adjustment, or additional graphic effect application). The specification information of a sensor may include, for example, information about the resolution of a camera sensor, information about the field of view of the camera sensor, brightness information of the camera sensor, information about whether the camera sensor supports 3D, information about the distance to a subject, or information about a position in which the camera sensor is disposed in the electronic device 201. The display specification information of a display may include, for example, the resolution, brightness, or the size of the display. These are exemplary examples, and embodiments of the disclosure are not limited thereto.

According to certain embodiments, when the activation of at least one other sensor is completed by the sensor and display change event, the processor 220 may determine whether it is possible to collect valid data by using the at least one other sensor. When the activation of at least one other sensor is completed, the processor 220 determine whether it is possible to collect valid data by using the at least one other sensor, based on at least one among whether the angle between the first housing 112 and the second housing 114 satisfies a designated angle condition, the folding state of the second display 122 (the folded state of the second display 122 according to the case in which at least a part of the second display 122 is folded to a designated angle), or whether an object sensed through at least one sensor is sensed through the at least one other sensor. For example, the designated angle condition may be a condition indicating an angle at which at least a part of the electronic device is not sensed within the field of view of the at least one other sensor. In another example, the designated angle condition may be a condition indicating an angle at which an object (or a subject), which a user desires to photograph, is included within the field of view of the at least one other sensor. The designated angle condition may be determined based on the angle between the first housing 112 and the second housing 114 or the state of the electronic device 201, which corresponds to at the time of occurrence of the sensor and display change event. For example, when a sensor and display change event occurs while the electronic device 201 is in a closed state, the designated angle condition may indicate an angle larger than 130 degrees. In another example, when a sensor and display change event occurs while the electronic device 201 is in an opened state, the designated angle condition may indicate an angle smaller than 45 degrees. This is merely an exemplary angle, and certain embodiments of the disclosure are not limited thereto.

According to an embodiment, when the activation of at least one other sensor is completed, the processor 220 may determine whether it is possible to collect valid data by using the at least one other sensor, based on whether an object sensed by a sensor used before event occurrence is sensed by the at least one other sensor. For example, when the activation of at least one other sensor is completed, the processor 220 may analyze data collected from the activated at least one other sensor to determine whether an object sensed by a sensor used before event occurrence is sensed by the activated at least one sensor. The processor 220 may compare an object sensed by at least one (e.g., the first sensor 130) with an object sensed by at least one other sensor (e.g., the second sensor 132) to determine the degree of similarity therebetween, and may determine, based on the determined degree of similarity, whether it is possible to collect valid data. For example, when the degree of similarity is equal to or higher than a designated value, the processor 220 may determine that it is possible to collect valid data, and when the degree of similarity is lower than the designated value, may determine that it is not possible to collect valid data.

According to certain embodiments, when valid data can be collected by the activated at least one other sensor, the processor 220 may compare, while using the data collected by the at least one other sensor as data for the first application, the data from the at least one other sensor with data collected by the at least one sensor to perform a designated function. When a designated gesture or a designated facial expression is identically detected from each of image data collected by the at least one other sensor and image data collected by the at least one sensor, the processor 220 may perform a designated function corresponding to the detected gesture or facial expression. The designated function corresponding to the gesture or facial expression may include at least one among a photographing function, a video recording function, a timer starting function for photographing or video recording, a graphic effect addition function, an object tracking function, or a focusing function. These are exemplary examples, and certain embodiments of the disclosure are not limited thereto. According to an embodiment, the processor 220 may perform a designated function when the designated gesture and the designated facial expression are not detected from each of the image data collected by the at least one other sensor and the image data collected by the at least one sensor but an identical gesture, an identical facial expression, or an identical object is detected therefrom.

According to certain embodiments, the electronic device 201 may include a connection part (e.g., the folding part 116 in FIGS. 1A and 1B), a first housing (e.g., the first housing 112 in FIGS. 1A and 1B) in which at least one first sensor (e.g., the first sensor 130 in FIG. 1B) is disposed, a second housing (e.g., the second housing 114 in FIGS. 1A and 1B) in which at least one second sensor (e.g., the second sensor 132 in FIG. 1A) is disposed, a first display (e.g., the first display 120 in FIG. 1B) disposed in the first housing 112, a second display (e.g., the second display 122 in FIG. 1A) which is disposed in a space formed by the first housing 112 and the second housing 114, and at least a portion of which folds, at least one sensor part (e.g., the angle sensing sensor 160 in FIGS. 1A and 1B) configured to sense an angle formed by the first housing 112 and the second housing 114, and a processor (e.g., the processor 220 in FIG. 2) operatively connected to the first display 120, the second display 122, the angle sensing sensor part 160, the first sensor 130, and the second sensor 132, wherein the processor 220 is configured to sense a change in an angle between the first housing 112 and the second housing 114, control the second sensor 132 to be activated in response to the angle change, use data collected from the first sensor 130 as data for an application until activation of the second sensor 132 is completed, and use data collected from the second sensor 132 as data for the application when the activation of the second sensor 132 is completed.

According to an embodiment, the data collected from the first sensor 130 may include at least one among data collected from the first sensor 130 when the angle change is sensed, data collected from the first sensor 130 before the angle change is sensed, or data collected from the first sensor 130 and stored before the angle change is sensed.

According to an embodiment, the processor 220 may be configured to use, when the activation of the second sensor 132 is sensed, the data previously collected from the first sensor 130 as data for the application until the angle between the first housing 112 and the second housing 114 satisfies a designated angle range.

According to an embodiment, the processor 220 may be configured to determine, when the activation of the second sensor 132 is sensed, whether object is sensed by the second sensor 132, use, when the object sensed by the first sensor 130 is not sensed by the second sensor 132, the data previously collected from the first sensor 130 as data for the application until the object is sensed by the second sensor 132, and use the data collected from the second sensor 132 as data for the application when the object is sensed by the second sensor.

According to an embodiment, the processor 220 may control, before the angle change is sensed, a first image generated using the data collected from the first sensor 130 to be displayed on the first display 120, and may control, after the angle change is sensed, the data previously collected from the first sensor 130 to be displayed on the second display 122.

According to an embodiment, the processor 220 may process the data previously collected from the first sensor 130, based on at least one among specification information of the first sensor 130, specification information of the second sensor 132, specification information of the first display 120, or specification information of the second display 122, and may control the processed data to be displayed on the second display 122.

According to an embodiment, the specification information of the first sensor 130 or specification information of the second sensor 132 may include at least one among resolution information, field-of-view information, arrangement position information, information about the distance to an object, brightness information, or information whether 3D is supported.

According to an embodiment, specification information of the first display 120 or specification information of the second display 122 may include at least one among resolution information, size information, or brightness information.

According to an embodiment, the processing may include at least one among changing the position of an object, changing the size of the object, changing the brightness of a screen, changing the resolution, changing a focus, or adding a graphic effect. For example, when the resolution of the first display 120 is a first resolution, the electronic device 101 may change an image acquired by a first camera to a first image processed in accordance with the first resolution and may provide the first image to a user through the first display. When an event requiring switching to the second display 122 occurs (e.g., when the folding state of the second display 122 is changed to an unfolded state), the electronic device 101 may process the image acquired by the first camera in accordance with a second resolution which is the resolution of the second display 122, and may provide the processed second image through the second display until a predetermined time or a predetermined condition is satisfied.

According to an embodiment, the electronic device 101 may generate a third image by changing an image acquired by a second camera in accordance with the resolution of the second display 122 while providing the second image through the second display 122 based on the folding state of the second display 101, and may provide the third image through the second display 122. According to an embodiment, the third image may be simultaneously displayed together with the second image for at least a predetermined time. Further, a fourth image obtained by synthesizing the second image with the third image, or a fifth image including the second image and the third image may be displayed according to the user's input, the type of application displayed through the second display 122, or a preconfigured environment. According to an embodiment, the second image may be displayed while being included in the third image. According to an embodiment, when making a change from a state in which the second image is displayed to a state in which the third image is displayed, the electronic device 101 may display at least one fourth image between the second image and the third image for making a natural change.

According to an embodiment, the electronic device 201 may further include a communication module (e.g., the communication module 290 in FIG. 2), and the processor 220 may perform, when the application is an application configured to communicate with at least one other device, control to transmit the data collected from the first sensor 130 or the second sensor 132 or other data generated using the data collected from the first sensor 130 to the at least one other electronic device through the communication module 290.

According to an embodiment, the electronic device 201 may further include a communication module (e.g., the communication module 290 in FIG. 2), and the processor 220 perform, when the application is an application configured to communicate with at least one other device, control to transmit, in response to the angle change, the data collected from the first sensor or data generated by using the data collected from the first sensor to the at least one other electronic device through the communication module 290 when the angle is a designated first angle.

According to an embodiment, the processor 220 may control the first sensor 130 to be deactivated in response to the angle change.

According to an embodiment, the processor 220 may be configured to compare, when the activation of the second sensor 132 is completed, the data previously collected from the first sensor 130 with data collected from the activated second sensor 132, and perform at least one function based on the result of the comparison.

According to an embodiment, the processor 220 may be configured to perform a designated function of an application when data generated by the first sensor 130 is identical to data generated by the activated second sensor 132.

According to an embodiment, the processor 220 may be configured to perform a designated function of an application when at least one of a designated gesture or a designated facial expression is identically detected from each of the data generated by the first sensor 130 and the data generated by the activated second sensor 132.

According to an embodiment, the first sensor 130 and the second sensor 132 may be camera sensors.

According to an embodiment, the first sensor 130 and the second sensor 132 may be ultra-wide band (UWB) sensors.

According to certain embodiments, the electronic device 101 may include a first display (e.g., the first display 120 in FIG. 1B or 1C), a second display (e.g., the second display 122 in FIG. 1A or 1D), at least a portion of which folds, a first camera (e.g., the first sensor 130 in FIG. 1B or 1C), a second camera (the second sensor 132 in FIG. 1A or 1D), and a processor (e.g., the processor 220 in FIG. 2), wherein the processor 220 may determine the folding state of the second display 122, may control, when the determined folding state corresponds to a designated first state, the first display 120 such that a first image generated based on image information acquired through the first camera 130 is displayed through the first display 120, may start, when the determined folding state corresponds to a designated second state, activation of the second camera 132, may control, before the activation of the second camera 132 is completed, the second display 122 such that a second image generated based on the image information acquired through the first camera 130 is displayed through the second display 122, and may control, when the activation of the second camera 132 is completed, the second display 122 such that a third image generated based on image information acquired through the second camera 132 is displayed through the second display 122.

According to an embodiment, when the activation of the second camera 132 is completed, the processor 220 may control the second display 122 such that the second image generated based on the image information acquired through the first camera 130 is displayed through the second display 122 until the folding state of the second display 122 satisfies a designated third state.

According to an embodiment, when the activation of the second camera 132 is completed, the processor 220 may control the second display 122 such that the second image generated based on the image information acquired through the first camera 130 is displayed through the second display 122 until an object sensed by the first camera 130 is sensed by the second camera 132.

Figure 3A:
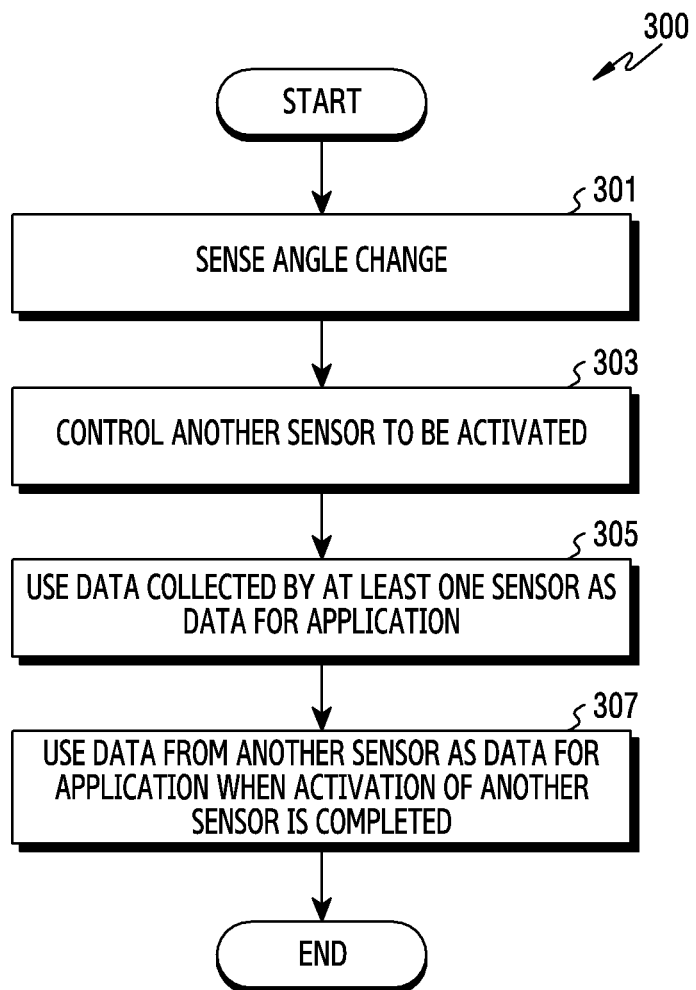
FIG. 3A is a flowchart illustrating sensor data processing based on an angle change in an electronic device according to certain embodiments.

FIG. 3A is a flowchart 300 illustrating sensor data processing based on an angle change in an electronic device 201 according to certain embodiments. Hereinafter, in embodiments, operations may be performed in sequence, but are not necessarily performed in sequence. For example, order of the operations may be changed, and at least two operations may be performed in parallel. Here, the electronic device may be the electronic device 101 in FIG. 1 and/or the electronic device 201 in FIG. 2. Hereinafter, at least some operations in FIG. 3A will be described with reference to FIGS. 3B to 3E. FIGS. 3B to 3E are illustrations showing changes in the angle of an electronic device according to certain embodiments.

Referring to FIG. 3A, an electronic device (e.g., the processor 220 in FIG. 2) according to certain embodiments may sense a change in the angle of the electronic device 101 in operation 301. According to an embodiment, the processor 220 may sense, based on at least one among an angle sensor, a strain sensor, a distance sensor, a gyroscope sensor, or a degree sensor, included in the electronic device 201, that the angle between the first surface 141 of the first housing 112 and the second surface 142 of the second housing 114 of the electronic device 201 is changed, or that the folding state of a second display (e.g., the second display 122 in FIG. 1A or 1D) is changed. For example, the processor 220 may sense that the angle between the first surface 141 of the first housing 112 and the second surface 142 of the second housing 114 of the electronic device 201 is changed, or the folding state of the second display 122 is changed, and thus the electronic device 201 switches from a closed state to a folded state (a partial open state) or changes from an unfolded state (a full open state) to a folded state.

Figure 3B:
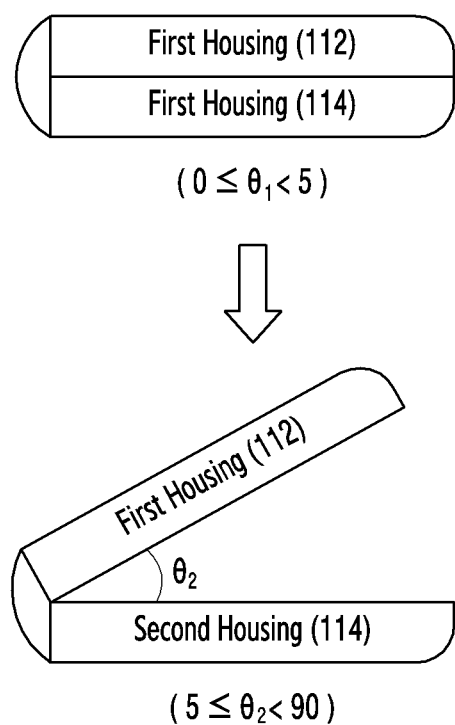
FIGS. 3B to 3E are illustrations showing a change in an angle of an electronic device according to certain embodiments.
Figure 3C:
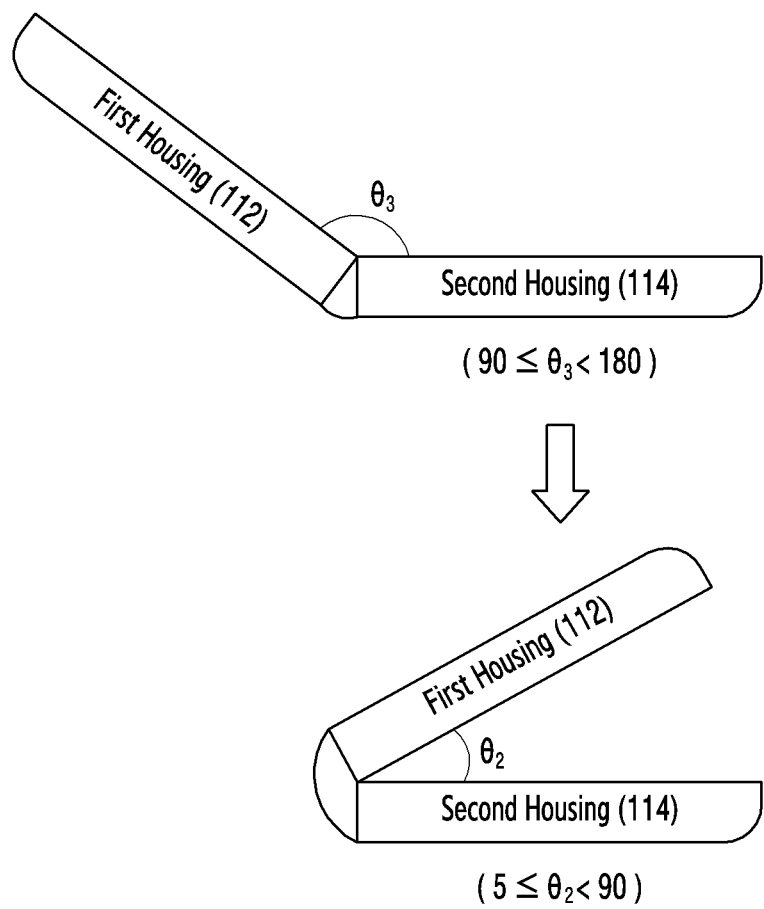
Figure 3D:
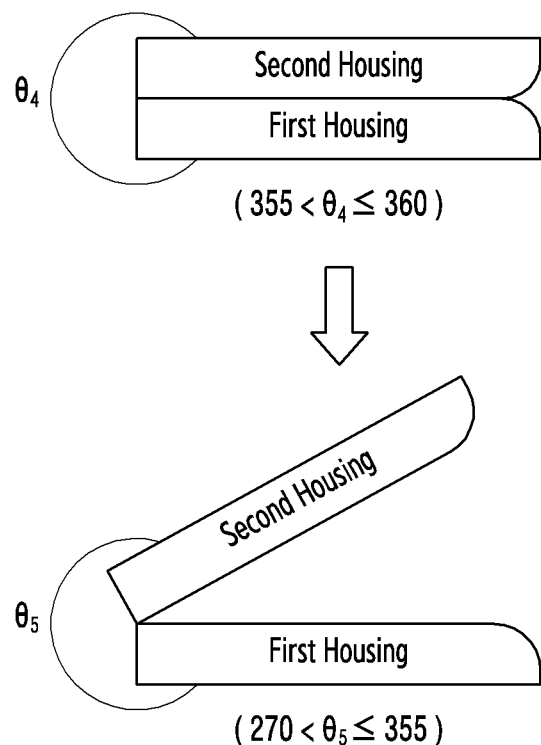
Figure 3E:
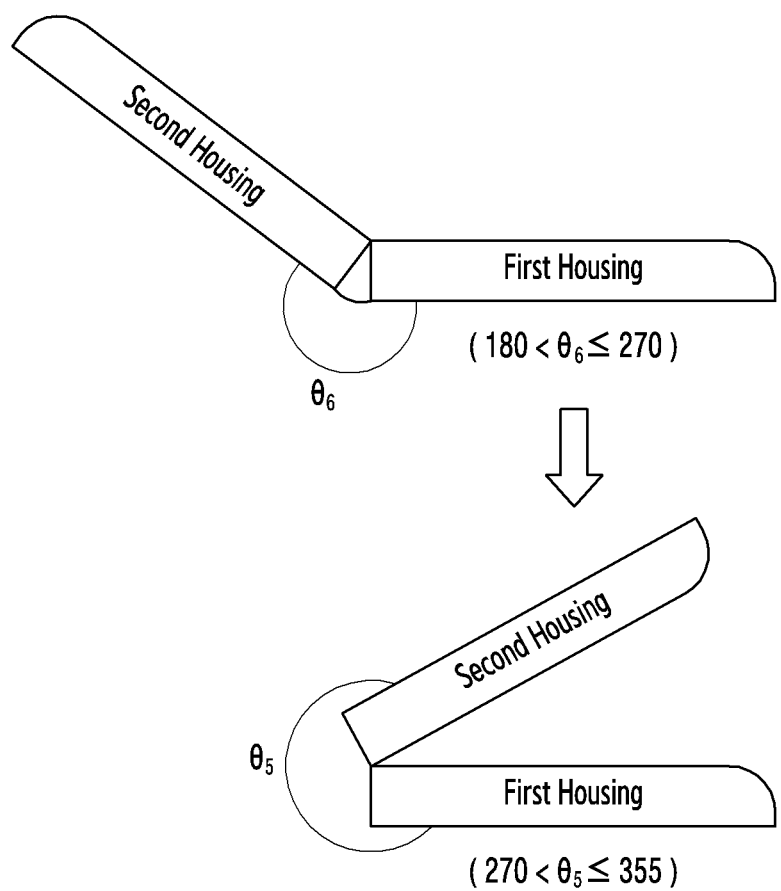

According to an embodiment, the processor 220 may determine whether an event for changing a sensor and changing a display output according to a change in the mechanical state, based on sensing a change in the angle of the electronic device 101 while providing a user interface of an application representative of the data from at least one sensor, or a fact that the folding state of the second display 122 has been changed. For example, while providing a user interface display associated with a first application operating in conjunction with a first sensor (e.g., the first sensor 130 in FIG. 1) and a first display (e.g., the first display 120 in FIG. 1), as illustrated in FIG. 3B, when the angle between the first surface 141 of the first housing 112 and the second surface 142 of the second housing 114 changes from a first angle θ1 within a first angle range (e.g., about 0 degrees-about 5 degrees) to an angle θ2 within a second angle range (e.g., about 5 degrees-about 90 degrees), or when at least part of the second display changes from a folded state to the angle θ1 within the first angle range to a folding state to the angle θ2 within the second angle range, the processor 220 may determine that an event for changing a sense linked with the first application from the first sensor 130 to the second sensor 132 and changing a display linked with the first application from the first display 120 to the second display 122 has occurred. In another example, while providing a user interface of the first application operating in conjunction with a second sensor (e.g., the second sensor 132 in FIG. 1) and a second display (e.g., the second display 122 in FIG. 1), as illustrated in FIG. 3C, when the angle between the first surface 141 of the first housing 112 and the second surface 142 of the second housing 114 changes from an angle θ3 within a third angle range (e.g., about 90 degrees-about 180 degrees) to an angle θ2 within the second angle range (e.g., about 5 degrees-about 90 degrees), or when at least a part of the second display 122 changes from a folded state to the angle θ3 within the third angle range to a folded state to the angle θ2 within the second angle range, the processor 220 may determine that an event for changing a sensor linked with the first application from the second sensor 132 to the second sensor 132 and changing a display linked with the first application from the first display 120 to the second display 122 has occurred. In another example, while providing a user interface of the first application operating in conjunction with the second sensor 132 and the second display 122, as illustrated in FIG. 3D, when the angle between the first housing 112 and the second housing 114 changes from an angle θ4 (i.e., an outfolding state) within a fourth angle range (e.g., about 355 degrees-about 360 degrees) to an angle (θ5) within a fifth angle range (e.g., about 270 degrees-about 355 degrees), or when at least a part of the second display 122 changes from a folded state to the angle θ4 within the fourth angle range to a folded state to the angle θ5 within the fifth angle range, the processor 220 may determine that an event for changing a sensor linked with the first application from the second sensor 132 to the first sensor 130 and changing a display linked with the first application from the second display 122 to the first display 120 has occurred. In another example, while providing a user interface of the first application operating in conjunction with the second sensor 132 and the second display 122, as illustrated in FIG. 3E, when the angle between the first housing 112 and the second housing 114 changes an angle θ6 within a sixth angle range (e.g., about 180 degrees-about 270 degrees) to an angle θ5 within the fifth angle range (e.g., about 270 degrees-about 355 degrees), or when at least a part of the second display 122 changes from a folded state to the angle θ6 within the sixth angle range to a folded state to the angle θ5 within the fifth angle range, the processor 220 may determine that an event for changing a sensor linked with the first application from the second sensor 132 to the first sensor 130 and changing a display linked with the first application from the second display 122 to the first display 120 has occurred. In another example, while providing a user interface of the first application operating in conjunction with the first sensor 130 and the first display 120, as illustrated in FIG. 3B, when the angle between the first housing 112 and the second housing 114 changes the angle θ1 within the first angle range (e.g., about 0 degrees-about 5 degrees) to the angle θ2 within the second angle range (e.g., about 5 degrees-about 90 degrees), or when at least a part of the second display 122 changes from a folded state to the angle θ1 within the first angle range to a folded state the angle θ2 within the second angle range, the processor 220 may determine that an event for additionally linking the second sensor 132 with the first application and changing a display linked with the first application from the first display 120 to the second display 122 has occurred. An application operating in conjunction with at least one sensor and a display may include at least one among, for example, a camera application, a video call application, an object sensing application, or an object recognition application. The mentioned applications are merely examples provided to help understanding, and certain embodiments of the disclosure will not be limited thereto.

According to certain embodiments, in operation 303, the electronic device (e.g., the processor 220) may control at least one other sensor to be activated. According to an embodiment, when a sensor and display change event is sensed, the processor 220 may control the sensor module 276 and/or the camera module 280 such that at least one other sensor to be linked with the first application switches from a deactivated state to an activated state and at least one sensor linked with the first application switches from an activated state to a deactivated state. For example, in a state in which the first sensor 130 is linked with a camera application, when an event for changing the sensor linked with the camera application from the first sensor 130 to the second sensor 132 is sensed, the processor 220 may request the sensor module 276 and/or the camera module 280 to activate the second sensor 132 and to deactivate the first sensor 130. According to an embodiment, when occurrence of a sensor and display change event is sensed, the processor 220 may control, while maintaining the activated state of at least one sensor linked with the first application, the sensor module 276 and/or the camera module 280 such that at least one other sensor, which is to be additionally linked, switches from a deactivated state to an activated state. For example, in the state in which the first sensor 130 is linked with the camera application, the processor 220 may request the sensor module 276 and/or the camera module 280 for the additional activation of the second sensor 132 while maintaining the activated state of the first sensor 130 linked with the camera application.

According to certain embodiments, in operation 305, the electronic device (e.g., the processor 220) may use data collected from at least one sensor as data for an application. According to an embodiment, from when the angle change is sensed (or when occurrence of a sensor and display change event is sensed) until when activation of at least one other sensor is completed, the processor 220 may process data collected from the at least one sensor, and may use the processed data as data for the application. For example, when a sensor linked with the first application is changed from the first sensor 130 to the second sensor 132 by the angle change in the electronic device 201, data cannot be collected by using the second sensor 132 until the activation of the second sensor 132 is completed, and thus the processor 220 may process data collected by the first sensor 130 instead of data from the second sensor 132, and may use the processed data as data for the first application. The data collected by the at least one sensor may include at least one among data which is collected by the at least one sensor before sensing of the angle change and stored in the memory 130, data which is acquired by the at least one sensor before sensing of the angle change but is not stored in the memory 130, or data which is acquired by the at least one sensor at the time of sensing of the angle change. For example, when an angle change is sensed at timing A, the data collected by the at least one sensor may include at least one among data which is collected by the at least one sensor during the time interval between timing A and a timing earlier than timing A by a designated time from timing A (e.g., a timing earlier by N seconds) and stored in the memory 130, data which is collected by the at least one sensor during the time interval between timing A and a timing earlier than timing A by a designated time from timing A (e.g., a timing earlier by N seconds) but is not stored in the memory 130, or data which is collected by the at least one sensor at timing A. For example, in a state in which the first sensor 130 is linked with a camera application, when an angle change is sensed at timing A, the data collected by the at least one sensor may include at least one piece of data among data collected by the first sensor 130 from a timing of A-N seconds until timing A. For example, from timing A at which an event has occurred until a timing at which the activation of the second sensor 132 is completed, the processor 220 may process, instead of data from the second sensor 132, at least one piece of data among the data collected by the first sensor 130 from the timing of A-N seconds until timing A, and may use the processed data as data for a first application. Using the processed data as data for the first application may include at least one of an operation of transmitting the processed data to another electronic device by using the first application or an operation of displaying the processed data through the screen of the first application.

According to an embodiment, the processor 220 may process data collected by at least one sensor, based on at least one among specification information of at least one sensor used before angle change sensing, specification information of at least one other sensor to be changed by angle change sensing, specification information of a display used before angle change sensing, and specification information of a display to be changed by angle change sensing, and may use the processed data as data for the first application. According to an embodiment, the processor 220 may process data such that at least one among the size of an object, the position of the object, a focus, or screen brightness is adjusted, based on the specification difference between at least one sensor, which has been previously used, and at least one other sensor which is to be changed or additionally linked, and/or the specification difference a display, which has been previously used, and a display which is to be changed. According to an embodiment, the processor 220 may process data such that the data includes an additional graphic effect, based on the specification difference between at least one sensor, which has been previously used, and at least one other sensor, which is to be changed or additionally linked, and/or the specification difference between a previously used display and a display to be changed.

According to certain embodiments, in operation 307, when the activation of the at least one other sensor is completed, the electronic device (e.g., the processor 220) may use data from the at least one other sensor as data for the application. According to an embodiment, when valid data can be collected using the at least one sensor, the processor 220 may use data collected by the at least one other sensor as data for the application. Whether valid data can be collected may be determined based on whether the angle between, the first surface 141 of the first housing 112 and the second surface 142 of the second housing 114 in the electronic device 201 satisfies a designated angle condition, whether the folding angle of the second display 122 satisfies the designated angle condition, or whether an object sensed through at least one sensor is sensed by at least one other sensor. According to an embodiment, when the activation of the at least one other sensor is completed and the angle between the first surface 141 of the first housing 112 and the second surface 142 of the second housing 114 satisfies the designated angle condition, or when the folding angle of the second display 122 satisfies the designated angle condition, the processor 220 may use data collected by the at least one other sensor as data for the application. For example, when the activation of the second sensor 132 is completed by a sensor and display change event occurring due to a change from a closed state to a folded state (a partial open state) and the angle between the first housing 112 and the second housing 114 is larger than a designated first angle (e.g., about 135 degrees), or when the folding angle of the second display 122 is larger than the designated first angle, the processor 220 may determine that valid data can be collected by using the second sensor 132, and may use the data collected by the second sensor 132 as data for the first application. In another example, when the activation of the first sensor 130 is completed by a sensor and display change event occurring due to a change from an unfolded state to a folded state (a partial open state) and the angle between the first housing 112 and the second housing 114 is smaller than a designated second angle (e.g., about 45 degrees), when the folding angle of the second display 122 is smaller than the designated second angle, the processor 220 may determine that valid data can be collected by using the first sensor 130, and may use the data collected by the first sensor 130 as data for the first application.

According to an embodiment, when the activation of the at least one other sensor has been completed but the angle between the first surface 141 of the first housing 112 and the second surface 142 of the second housing 114 does not satisfy the designated angle condition, or when the folding angle of the second display 122 does not satisfy the designated angle condition, the processor 220 may process, as in operation 305, data collected by the at least one sensor and use the processed data as data for the application, until the angle between the first surface 141 of the first housing 112 and the second surface 142 of the second housing 114 or the folding angle of the second display 122 satisfies the designated angle condition. For example, when the activation of the second sensor 132 has been completed by a sensor and display change event occurring due to a change from a closed state to a folded state (a partial open state) but the angle between the first housing 112 and the second housing 114 is equal to or smaller than the designated first angle (e.g., about 135 degrees), or when the folding angle of the second display 122 is equal to or smaller than the designated first angle, the processor 220 may determine that valid data cannot be collected by using the second sensor 132, and may use data collected by the first sensor 130 as data for the first application until it is determined that the valid data can be collected by using the second sensor 132. In another example, when the activation of the first sensor 130 has been completed by a sensor and display change event occurring due to a change from an unfolded stated to a folded state (a partial open state) but the angle between the first housing 112 and the second housing 114 is equal to or larger than the designated second angle (e.g., about 45 degrees), or when the folding angle of the second display 122 is equal to or larger than the designated second angle, the processor 220 may determine that valid data cannot be collected by using the first sensor 130, and may use data collected by the second sensor 132 as data for the first application until it is determined that the valid data can be collected by using the first sensor 130.

According to an embodiment, when the activation of the at least one other sensor is completed and an object sensed by the at least one sensor is sensed by the at least one other sensor, the processor 220 may use data collected by the at least one other sensor as data for the application. For example, when an object sensed by the first sensor 130 before occurrence of an event while the electronic device 201 is in a closed state is sensed by the second sensor 132 activated after the occurrence of the event, the processor 220 may determine that valid data can be collected by using the second sensor 132, and may use data collected by the second sensor 132 as data for the first application. In another example, when an object sensed by the second sensor 132 before occurrence of an event while the electronic device 201 is in an unfolded state is sensed by the first sensor 130 activated after the occurrence of the event, the processor 220 may determine that valid data can be collected by using the first sensor 130, and may use data collected by the first sensor 130 as data for the first application.

According to an embodiment, when the activation of the at least one other sensor has been completed but an object sensed by the at least one sensor is not sensed by the at least one other sensor, the processor 220 may process, as in operation 305, data collected by the at least one sensor and use the processed data as data for an application, until the object is sensed by the at least one other sensor. For example, when an object sensed by the first sensor 130 before occurrence of an event while the electronic device 201 is in a closed state is not sensed by the second sensor 132 activated after the occurrence of the event, the processor 220 may determine that valid data cannot be collected by using the second sensor 132, and may use data collected by the first sensor 130 as data for the first application until the valid data can be collected by using the second sensor 132. In another example, when an object sensed by the second sensor 132 before occurrence of an event while the electronic device 201 is in an unfolded state is not sensed by the first sensor 130 activated after the occurrence of the event, the processor 220 may determine that valid data cannot be collected by using the first sensor 130, and may use data collected by the second sensor 132 as data for the first application until the valid data can be collected by using the first sensor 130.

Figure 4:
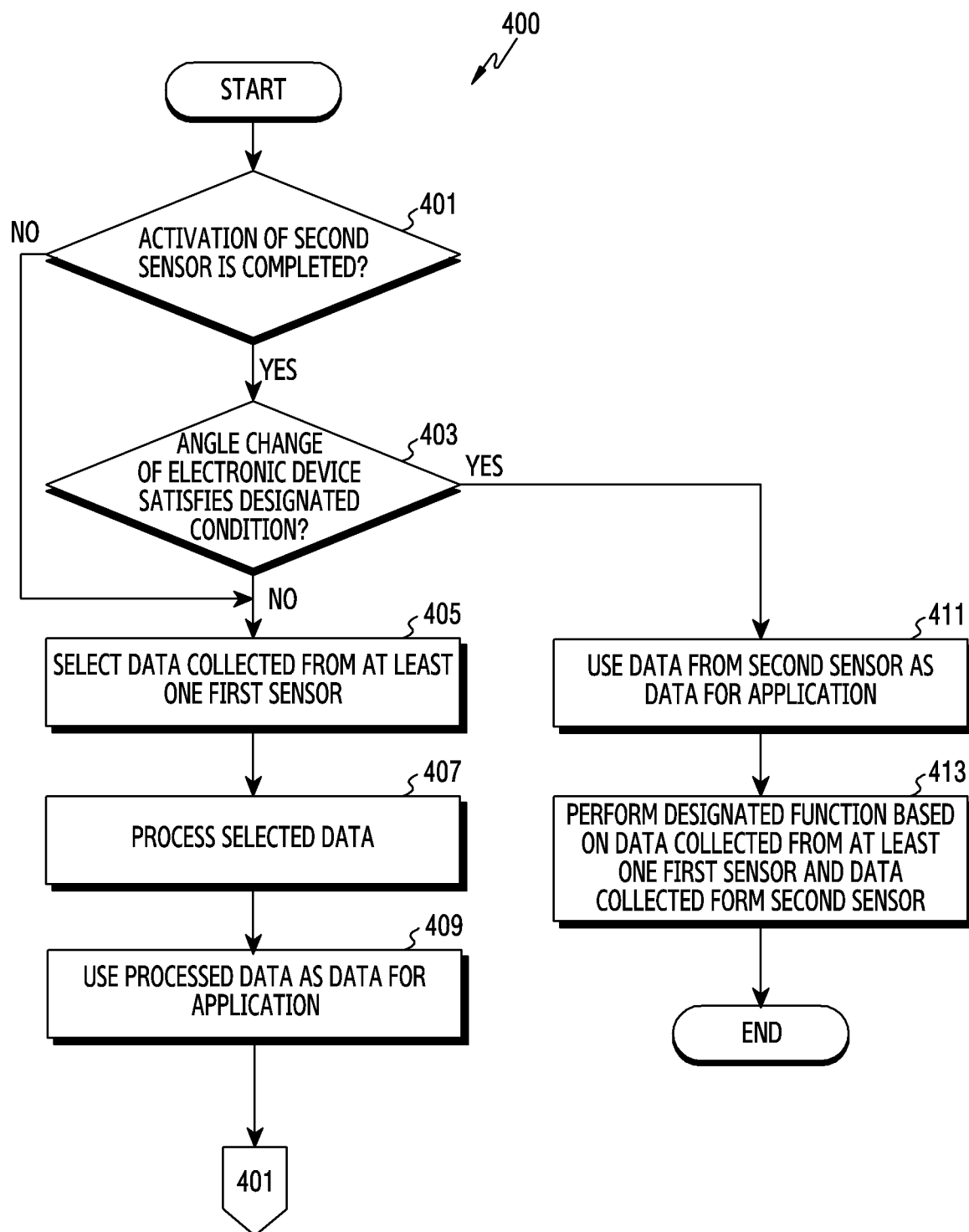
FIG. 4 is a flowchart illustrating use of data from a first sensor and/or a second sensor based on an angle change in an electronic device according to certain embodiments.
Figure 8:
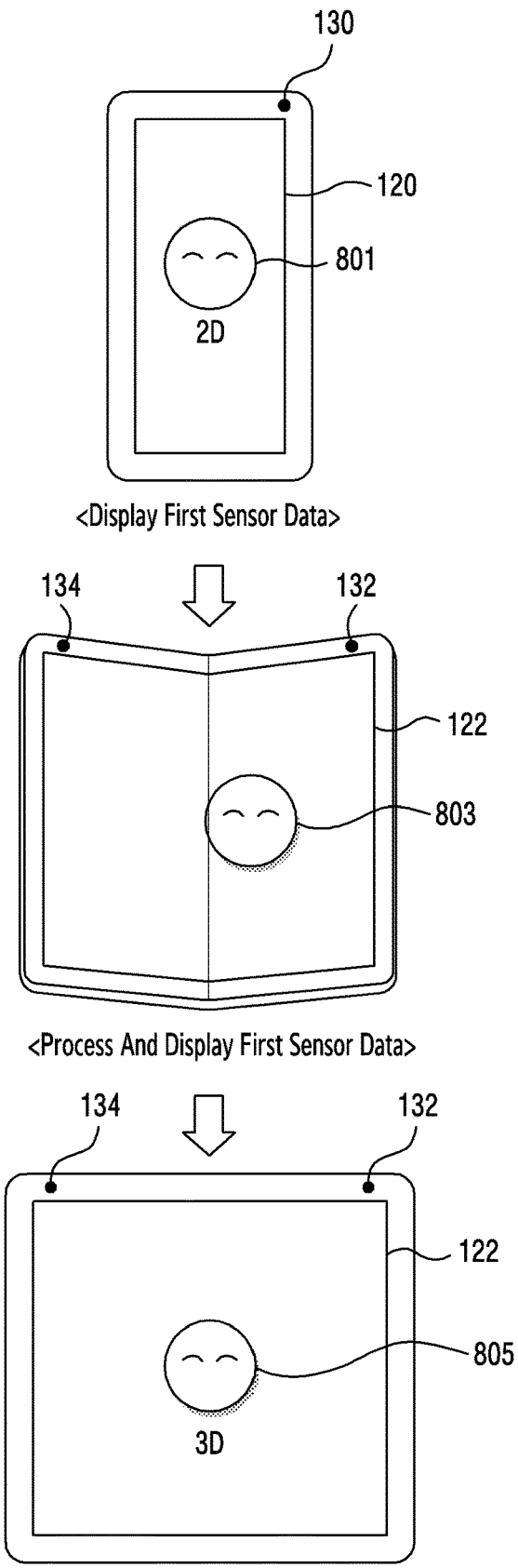
Figure 9:
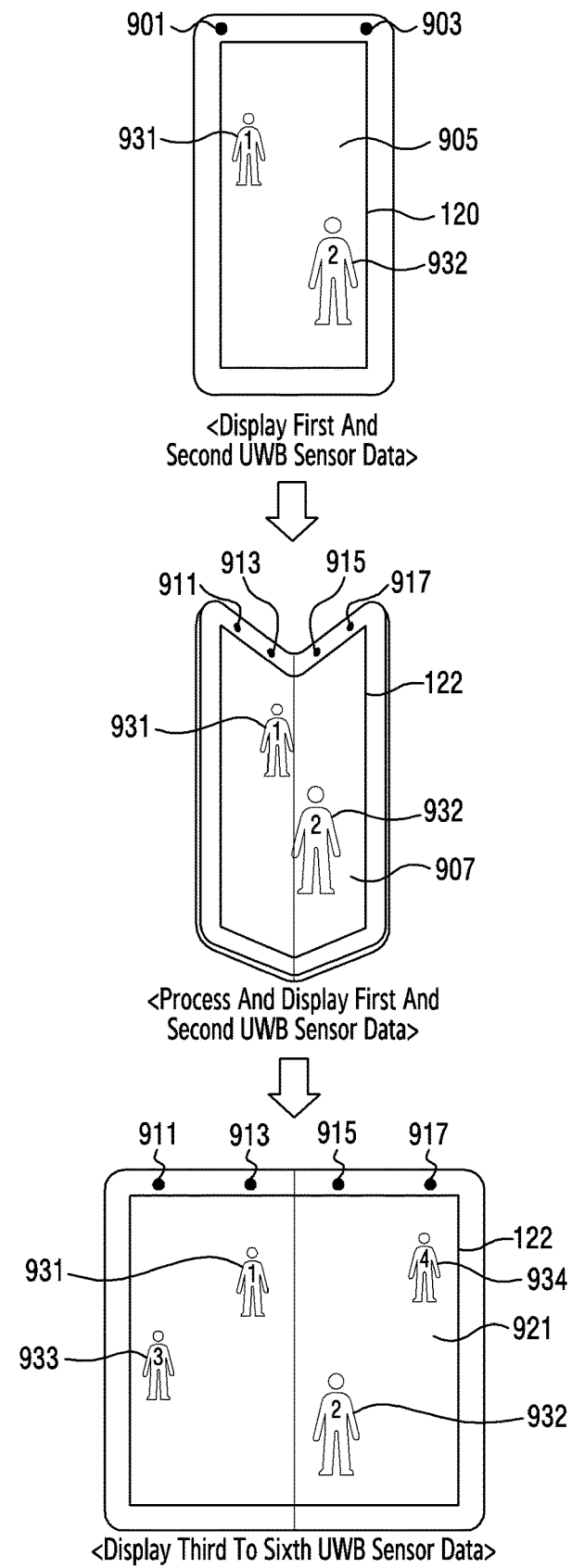
Figure 10:
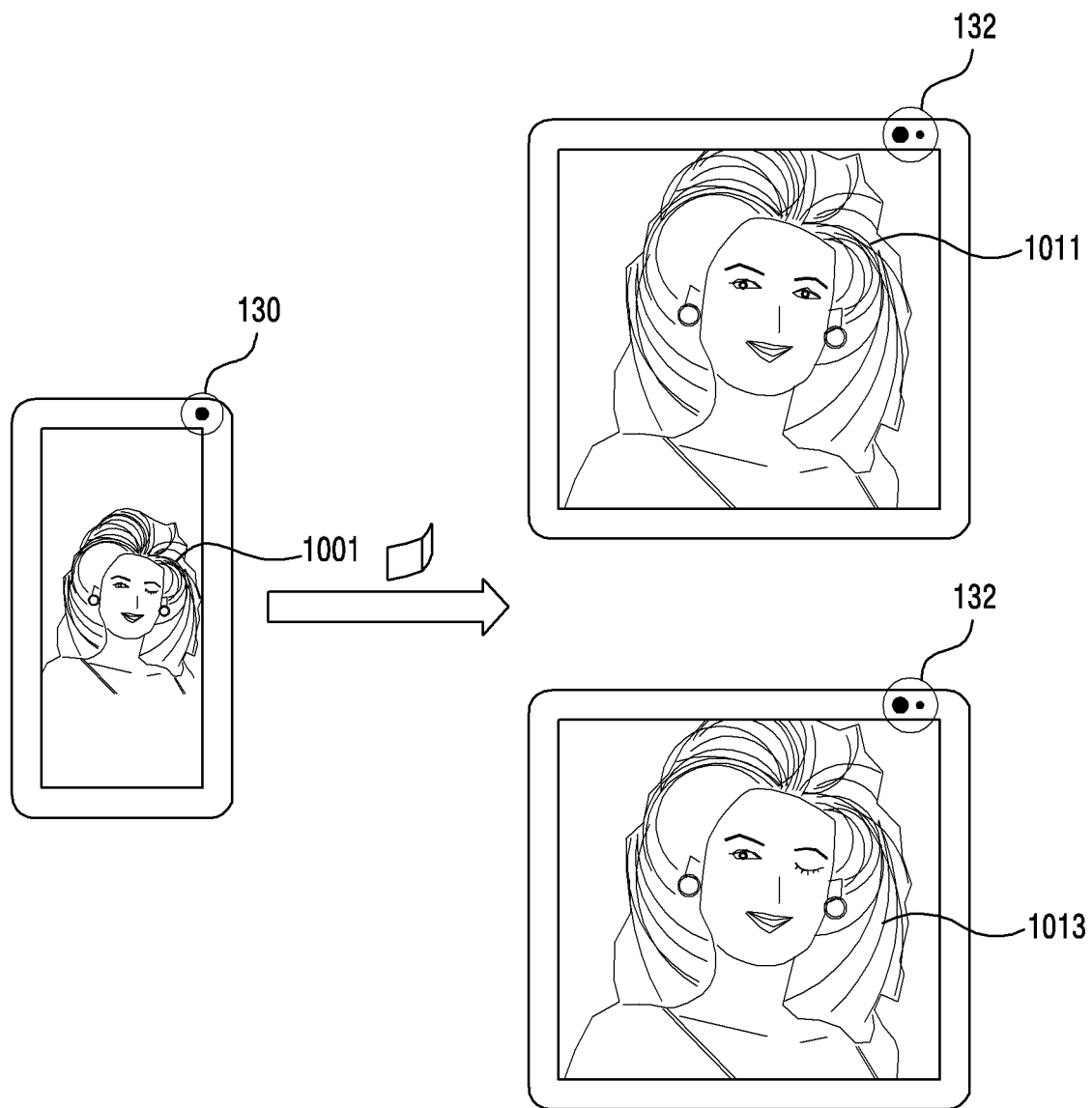
FIG. 10 is an illustration in which a designated function is performed using data from a first sensor and a second sensor based on an angle change in an electronic device according to certain embodiments.

FIG. 4 is a flowchart illustrating use of data from a first sensor and/or a second sensor based on an angle change in an electronic device according to certain embodiments. The operations in FIG. 4, described below, may be at least some of the detailed operations of operations 305 and 307 in FIG. 3A. In embodiments below, the respective operations may be performed in sequence, but are not necessarily performed in sequence. For example, the orders of the respective operations may be changed, and at least two operations may be performed in parallel. Here, an electronic device may be the electronic device 101 in FIG. 1 and/or the electronic device 201 in FIG. 2. Hereinafter, at least some operations in FIG. 4 will be described with reference to FIGS. 5 to 10. FIGS. 5 to 9 are illustrations in which first sensor data is processed based on an angle change in an electronic device according to certain embodiments. FIG. 10 is an illustration in which a designated function is performed using data from a first sensor and a second sensor based on an angle change in an electronic device according to certain embodiments.

Figure 5:
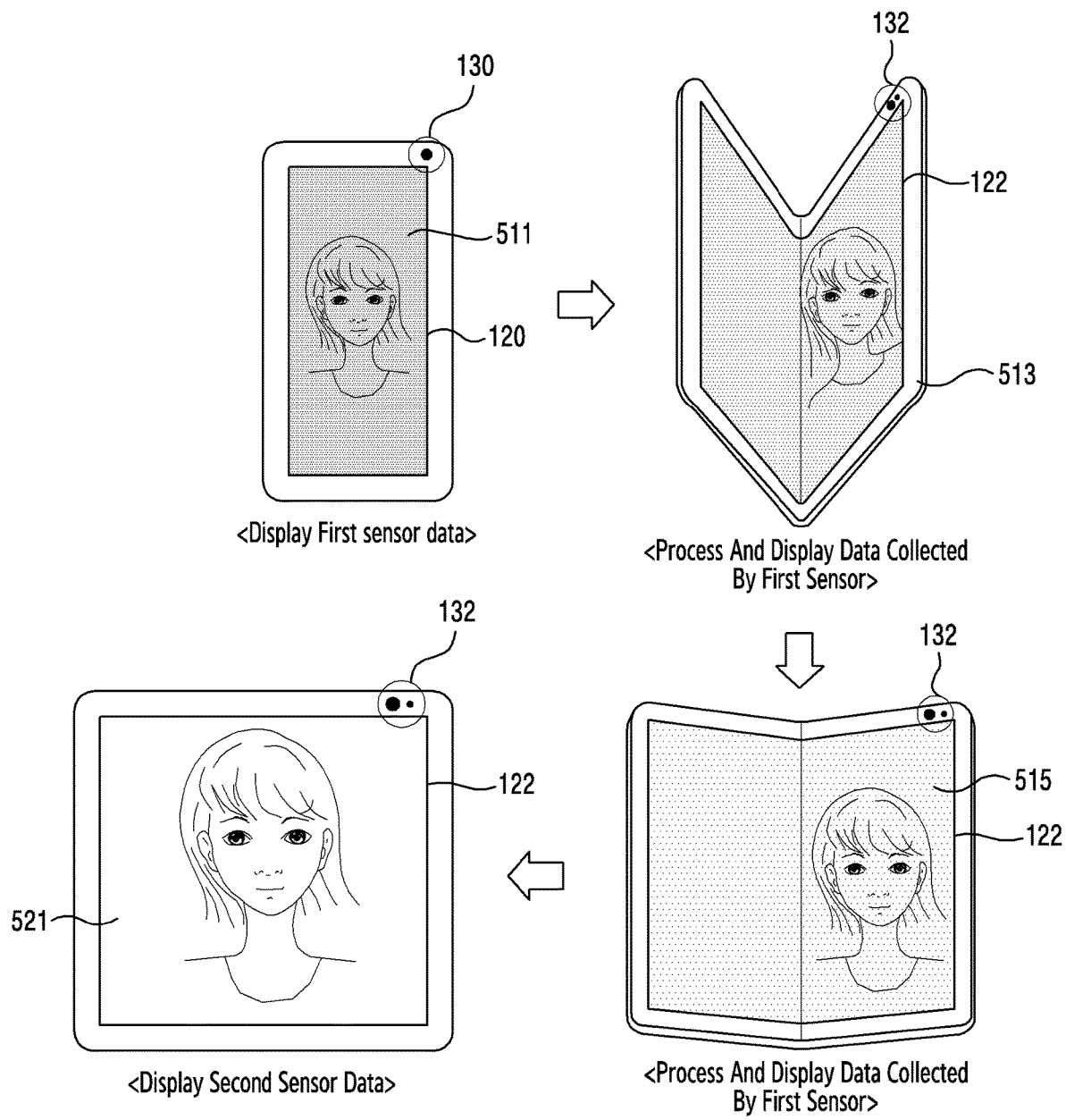
FIGS. 5 to 9 are illustrations in which first sensor data is processed based on an angle change in an electronic device according to certain embodiments.
Figure 6:
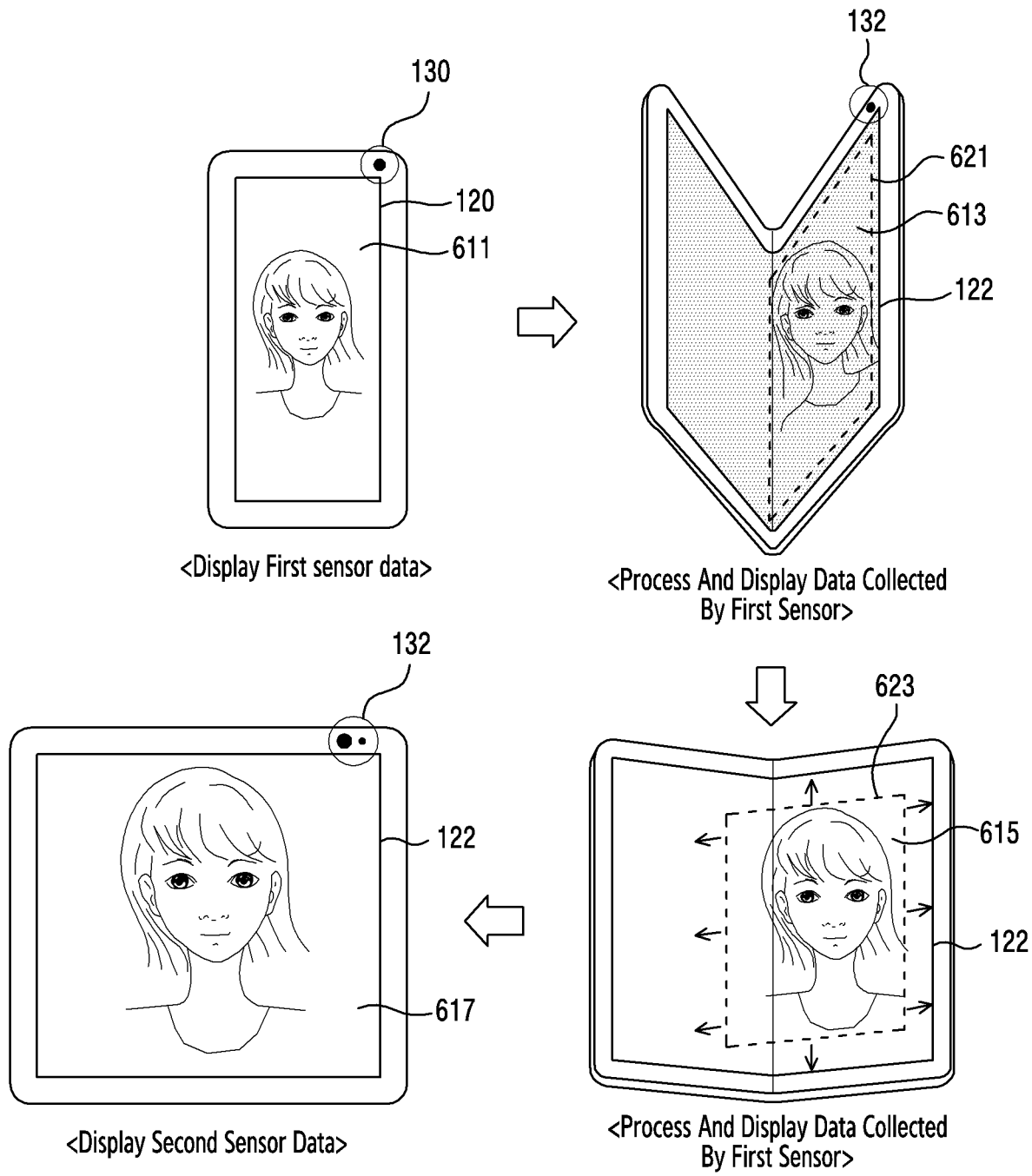
Figure 7:
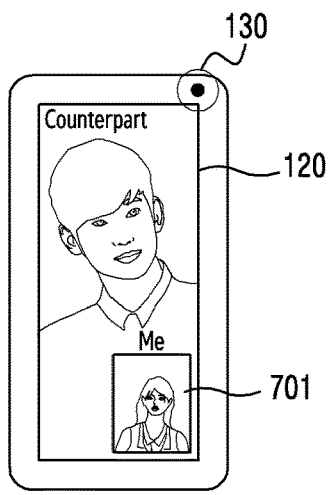
Figure 7:
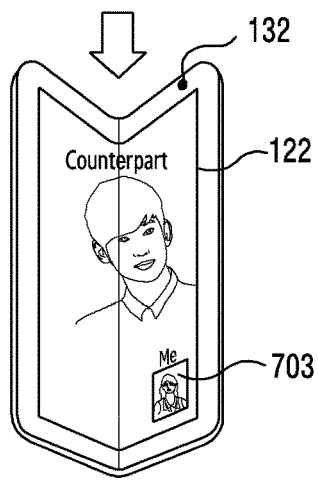
Figure 7:
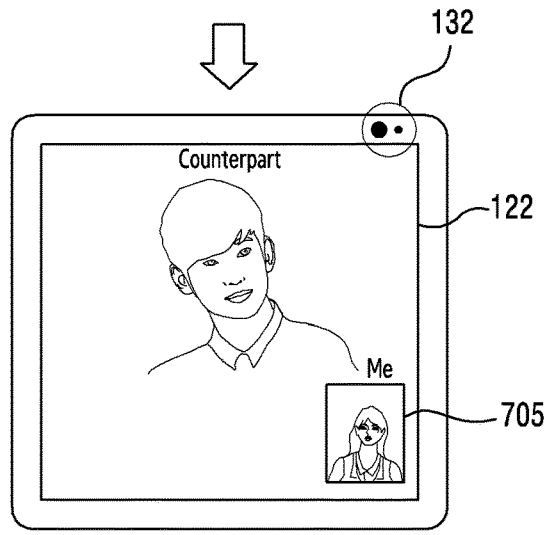

Referring to FIG. 4, in operation 401, an electronic device (e.g., the processor 220 in FIG. 2) according to certain embodiments may determine whether the activation of at least one second sensor (e.g., the second sensor 132 in FIG. 1) has been completed. The completed state of the activation of the at least one second sensor 132 may imply a state in which data can be collected from the at least one second sensor 132. For example, the processor 220 may determine whether image data can be collected through the second sensor 132. For example, as illustrated in FIGS. 5 and 6, when an angle change, by which the mechanical state of the electronic device is changed from a closed state to a folded state (a partial open state), is sensed while image data 511 or 611 acquired by the first sensor 130 is displayed on the first display 120 by using a camera application, the processor 220 may control the second sensor 132 to be activated. In another example, as illustrated in FIG. 7, when an angle change, by which the mechanical state of the electronic device is changed from a closed state to a folded state (a partial open state), is sensed while image data 701 acquired by the first sensor 130 and image data received from a counterpart electronic device are displayed on the first display 120 by using a video call application, the processor 220 may be control the second sensor 132 to be activated. In another example, as illustrated in FIG. 8, when an angle change, by which the mechanical state of the electronic device is changed from a closed state to a folded state (a partial open state) is sensed while 2D image data 801 acquired by the first sensor 130 is displayed on the first display 120 by using the camera application, the processor 220 may control the second sensor 132 and the third sensor 134, which support 3D, to be activated. In another example, when an angle change, by which the mechanical state of the electronic device is changed from a closed state to a folded state (a partial open state), is sensed while object sensing results acquired by UWB sensors 901 and 903 provided on the third surface (or the first rear surface) 143 of the first housing are displayed on the first display 120 by using an object sensing application, the processor 220 may control sensors 911, 913, 915, and 917, arranged in the first surface 141 of the first housing 112 and the second surface 142 of the second housing 114, to be activated.

According to certain embodiments, when the activation of the at least one second sensor 132 is completed, the electronic device (e.g., the processor 220) may determine, in operation 403, whether an angle change in the electronic device satisfies the designated angle condition. The designated angle condition may be determined based on a state before the angle change in the electronic device 201 is sensed. For example, when an angle change is sensed while the electronic device 201 is in a closed state, the designated angle condition may be an angle condition indicating a state in which the electronic device 201 is folded and/or unfolded. For example, when an angle change, by which the electronic device 201 changes from a closed state to a folded state and/or an unfolded state, the designated angle condition may be a condition (e.g., about 135 degrees or greater) indicating an angle at which a part of the first housing 112 of the electronic device 201 is not sensed within the field of view of the second sensor 132 to be used in an unfolded state. In another example, when an angle change, by which the electronic device 201 is changed from an unfolded state to a folded state and/or a closed state, is sensed, the designated angle condition may be an angle condition indicating a state in which the electronic device 201 is folded and/or closed. For example, when an angle change, by which the electronic device 201 is changed from an unfolded state to a folded state and/or a closed state, is sensed, the designated angle condition may be a condition (e.g., about 20 degrees or less) indicating an angle at which an object sensed by the second sensor 132 used in an unfolded state can be sensed by at least one first sensor 130 or an angle at which the object can be included within the field of view of the at least one first sensor 130. The designated angle condition may be configured and/or changed by a designer and/or a user.

According to certain embodiments, when an angle change in the electronic device does not satisfy the designated condition, or when the activation of the at least one second sensor 132 is not completed, the electronic device (e.g., the processor 220) may select, in operation 405, data collected from the at least one first sensor 130 used before the angle change is sensed. The data collected from the at least one first sensor 130 used before the angle change is sensed may be valid data. According to an embodiment, the data collected from the at least one first sensor 130 used before the angle change is sensed may include at least one among data, which has been collected by the at least one first sensor 130 before sensing the angle change and stored in the memory 130, data, which has been collected by the at least one first sensor 130 before sensing the angle change but has not been stored in the memory 130, or data, which has been acquired by the at least one first sensor 130 before sensing the angle change. For example, from timing A, at which the angle change is sensed, until the activation of the at least one second sensor 132 is completed and the angle of the electronic device 201 satisfies the designated angle condition, the processor 220 may select, instead of data from the at least one second sensor 132, at least one piece of data from among data collected by the first sensor 130 from a timing of A-N seconds until timing A, and may process the selected at least one piece of data.

According to certain embodiments, in operation 407, the electronic device (e.g., the processor 220) may process the selected data. According to an embodiment, the processor 220 may process the selected data, based on at least one among specification information of the at least one first sensor 130 used before angle change sensing, specification information of the at least one second sensor 132 to be changed or additionally linked by angle change sensing, specification information of a display used before angle change sensing, or specification information of a display to be changed by angle change sensing. According to an embodiment, the processor 220 may process the selected data such that at least one among the size of an object included in the selected data, the position of the object, a focus, or screen brightness is adjusted, based on the specification difference between at least one first sensor 130, which has been previously used, and the at least one second sensor 132, which is to be changed or additionally linked, and/or the specification difference between a previously used display and a display to be changed. For example, in order to minimize a sense of difference which a user may experience due to the difference between an image-capturing environment using the at least one first sensor 130 and a display before an angle change and an image-capturing environment using the at least one second sensor 132 and a display after the angle change, the processor 220 may process the selected data such that at least one among the size of an object included in the selected data, the position of the object, a focus, or screen brightness is adjusted. According to an embodiment, the processor 220 may process the data, further based on at least one among the type of application, the characteristic of application, and the function of application other than the above-described pieces of specification information, such that at least one among the size of an object, the position of the object, a focus, or screen brightness is adjusted. For example, when a video call application is being executed, the resolution of image data (or a frame) transmitted to a counterpart electronic device performing a video call is fixed, and thus the processor 220 may process selected image data such that at least one among the brightness of the selected image, the size of an object included in the selected image data, the position of the object, or a focus is changed, without changing the resolution of the selected image data. In another example, when a camera application is being executed and when an angle change is sensed during the preview state of the camera application, a resolution change is possible during the preview state, and thus the processor 220 may process selected image data such that at least one among the resolution of the selected image data, the brightness thereof, the size of an object, the position of the object, or a focus is adjusted. At the time of processing the selected image data, the processor 220 may adjust, based on the angle of the electronic device 201, at least one among resolution, brightness, the size of an object, the position of the object, or a focus in stages. For example, the processor 220 may adjust the brightness of the selected image data to gradually increase as the amount of change in the angle of the electronic device 201 increases. In another example, the processor 220 may adjust the size of an object included in the selected image data to gradually increase as the amount of change in the angle of the electronic device 201 increases. According to an embodiment, the processor 220 may process data, based on the specification difference between the at least one first sensor 130 used before angle change sensing and the at least one second sensor 132 to be changed or additionally linked, and/or the specification difference between a display used before angle change sensing and a display to be changed, such that the data includes an additional graphic effect.

According to certain embodiments, in operation 409, the electronic device (e.g., the processor 220) may use the processed data as data for an application. According to an embodiment, the processor 220 may perform control such that a user interface including the processed data is provided through a display to be changed by angle change sensing. The user interface including the processed data may be a user interface corresponding to the application. According to an embodiment, the processor 220 may control the processed data to be transmitted to a counterpart electronic device connected by using the application. For example, as illustrated in FIG. 5, when the change in the angle of the electronic device 201 does not satisfy the designated condition, or when the activation of the second sensor 132 is not completed, the processor 220 may process image data acquired by the first sensor 130 at the time of angle change sensing or before angle change sensing to adjust at least one among resolution, brightness, the size of an object, the position thereof, or a focus, and may control processed image data 513 or 515 to be displayed on the second display 122. In another example, as illustrated in FIG. 6, when the change in the angle of the electronic device 201 does not satisfy the designated condition, or when the activation of the second sensor 132 is not completed, the processor 220 may process image data acquired by the first sensor 130 at the time of angle change sensing or before angle change sensing to adjust at least one among resolution, brightness, the size of an object, the position thereof, or a focus, and may control guide information 621 or 615, indicating that data from the first sensor 130 is processed and is being displayed, to be additionally displayed, while controlling processed image data 613 or 615 to be displayed on the second display 122. The guide information 621 or 615, indicating that data from the first sensor 130 is processed and is being displayed, may indicate a display area for the processed image data. In another example, as illustrated in FIG. 7, when the change in the angle of the electronic device 201 does not satisfy the designated condition, or when the activation of the second sensor 132 is not completed, the processor 220 may process image data acquired by the first sensor 130 at the time of angle change sensing or before angle change sensing to adjust at least one among resolution, brightness, the size of an object, the position thereof, or a focus, and may control processed image data 703 to be transmitted to a counterpart electronic device performing a video call while being displayed in a partial area of the second display 122. In another example, as illustrated in FIG. 8, when the change in the angle of the electronic device 201 does not satisfy the designated condition, or when the activation of the second sensor 132 and the third sensor 134 is not completed, the processor 220 may process image data acquired by the first sensor 130 at the time of angle change sensing or before angle change sensing such that a graphic effect is added to the data, and may control processed image data 803 to be displayed on the second display 122. The graphic effect may include at least one among an effect in which a 2D object looks like a 3D object, a sticker addition and/or change effect, or an avatar addition and/or change effect. The graphic effect may be determined based on the distance to an object. In another example, as illustrated in FIG. 9, when the change in the angle of the electronic device 201 does not satisfy the designated condition, or when the activation of the UWB sensors 911, 913, 915, and 917 arranged in the first surface 141 of the first housing 112 and the second surface 142 of the second housing 114 is not completed, the processor 220 may process object sensing data acquired by the UWB sensors 901 and 903, arrange on the third surface (or the first rear surface) of the first housing, at the time of angle change sensing or before angle change sensing to adjust at least one of the position or the size of an object, and may control processed object sensing data 907 to be displayed on the second display 122.

According to certain embodiments, when the change in the angle of the electronic device satisfies the designated condition, the electronic device (e.g., the processor 220) may use, in operation 411, data collected from at least one second sensor 132 as data for an application using the second display. According to an embodiment, the processor 220 may configure a user interface corresponding to the application by using the data collected from the at least one second sensor 132, and may control the configured user interface to be provided through a display which is to be changed by angle change sensing. For example, as illustrated in FIGS. 5 and 6, when the activation of the second sensor 132 is completed and when the angle change satisfies the designated condition, the processor 220 may perform control such that image data 521 or 617 acquired by the second sensor 132 is displayed on the second display 122. According to an embodiment, the processor 220 may perform control such the data collected from the at least one sensor 132 is transmitted to another electronic device outside the electronic device 101. For example, as illustrated in FIG. 7, when the activation of the second sensor 132 is completed and when the angle change satisfies the designated condition, the processor 220 may perform control such that image data 705 acquired by the second sensor 132 is transmitted to a counterpart electronic device, which is performing a video call, while being displayed in a partial area of the second display 122. In another example, as illustrated in FIG. 8, when the activation of the second sensor 132 and the third sensor 134 is completed, and when the angle change satisfies the designated condition, the processor 220 may generate 3D image data 805 based on image information acquired by the second sensor 132 and the third sensor 134. The electronic device may control the 3D image data 805, generated based on the second sensor 132 and the third sensor 134, to be displayed the second display 122. In another example, as illustrated in FIG. 9, when the activation of the ultra-wide band (UWB) sensors 911, 913, 915, and 917, arranged in the first surface 141 of the first housing 112 and the second surface 142 of the second housing 114, is completed, and when the angle change satisfies the designated condition, the processor 220 may control such that object sensing data 921, acquired by the ultra-wide band (UWB) sensors 911, 913, 915, and 917 arranged in the first surface 141 of the first housing 112 and the second surface 142 of the second housing 114, is displayed on the second display 122. When the electronic device 101 is unfolded to a predetermined angle while first object 931 and second object 932, recognized by the UWB sensors 901 and 903 arranged in the third surface 143 of the first housing 112, are displayed on the first display 120, the activation of at least some of the UWB sensors 911, 913, 915, and 917 in the first surface 141 and the second surface 142 may not be completed. The processor 220 may control first object 931 and second object 932, recognized by the UWB sensors 901 and 903 in the third surface, to be displayed through the second display 122 until all of the UWB sensors 911, 913, 915, and 917 in the first surface and the second surface are activated, and when the activation of the UWB sensors 911, 913, 915, and 917 in the first and second surface is completed, may perform control such that at least one object (e.g., third object 933 or fourth object 934) 3 or 4 additionally sensed by the UWB sensors 911, 913, 915, and 917 in the first surface and the second surface is additionally displayed through the second display 122. The processor 220 may perform control such that third object 933 and fourth object 934, which have been additionally sensed, and first object 931 and second object 932, which have been previously sensed by the UWB sensors 901 and 903 in the third surface, are displayed through the second display 122 which is a single screen. In order to naturally display the objects sensed and generated by the activation of the UWB sensors 901, 903, 911, 913, 915, and 917, the processor 220 may generate images 905 and 907 including objects 1 and 2 931 and 933 and an image 921 including objects 1, 2, 3, and 4 931, 932, 933, and 934, and may display the images on the first display 120 or the second display 122. According to certain embodiments of the disclosure, when the mechanical state of the electronic device is changed, various other sensors in addition to the UWB sensors may be used to continuously perform functions (e.g., object sensing or movement sensing).

According to certain embodiments, in operation 413, the electronic device (e.g., the processor 220) may perform a designated function based on data previously collected from at least one sensor and data collected from at least one other sensor. Referring to FIG. 10, the electronic device may analyze objects included in images acquired by the first sensor 130 and the second sensor 132 of the electronic device, and may perform a designated operation. According to an embodiment, the processor 220 may perform an automatically designated function (e.g., a photographing function) when the electronic device 201 changes from a closed state to an unfolded state, when a subject 1001 making a winking facial expression which is a designated facial expression has been sensed through the first sensor 130 in the closed state, and when a subject 1013 having a winking facial expression is identically sensed through the second sensor 132 after changing to the unfolded state. In another example, when a subject 1011 making a facial expression other than a winking facial expression is sensed through the second sensor 132 after changing to the unfolded state, the processor 220 may not perform the designated function but may continuously perform a pre-executed function (e.g., a preview function). According to an embodiment, the processor 220 may perform the designated function when a designated gesture and a designated facial expression are not detected but an identical gesture or an identical facial expression is detected from each of image data collected by the at least one other sensor and image data collected by the at least one sensor. For example, the processor 220 may automatically perform the photographing function when the electronic device 201 changes from a closed state to an unfolded state, when it has been sensed, through the first sensor 130 in the closed state, that a user makes a V-gesture by using fingers, and when it is also sensed, through the second sensor 132 after changing to the unfolded state, that the user makes a V-gesture. According to an embodiment, the processor 220 may perform the designated function when an identical object is detected from each of image data collected by the at least one other sensor and image data collected by the at least one sensor. The designated function may include an object tracking function or a focusing function. These are exemplary examples, and certain embodiments of the disclosure are not limited thereto. For example, when the electronic device 201 changes from a closed state to an unfolded state, when a user A has been detected through the first sensor 130 in the closed state, and when the user A is identically detected through the second sensor 132 after changing to the unfolded state, the processor 220 may track the user A, and may control information about the tracking of the user A to be displayed on the second display 122.

Figure 11:
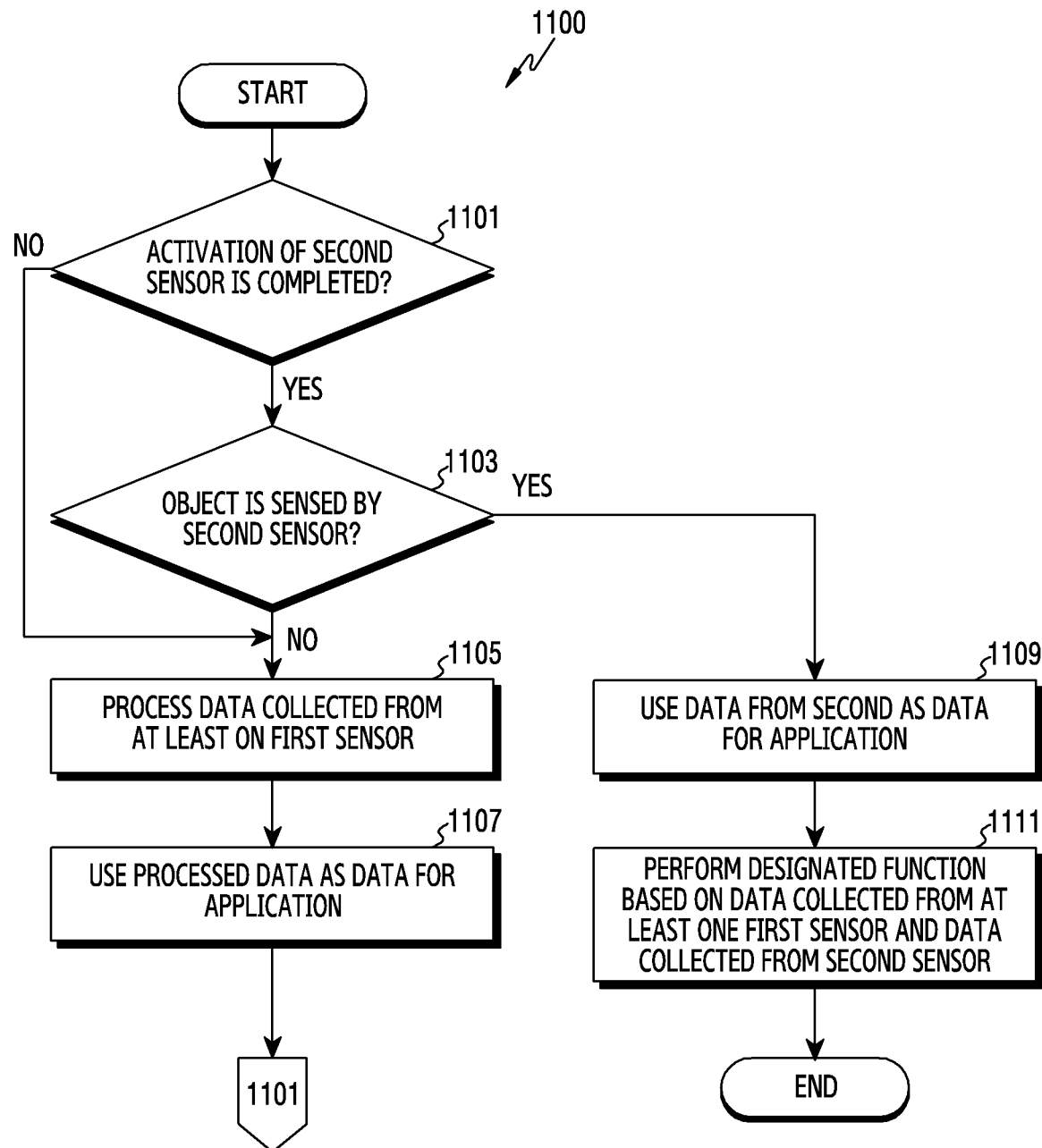
FIG. 11 is a flowchart illustrating use of data from a first sensor and/or a second sensor based on whether an object is sensed according to an angle change in an electronic device according to certain embodiments.
Figure 12:
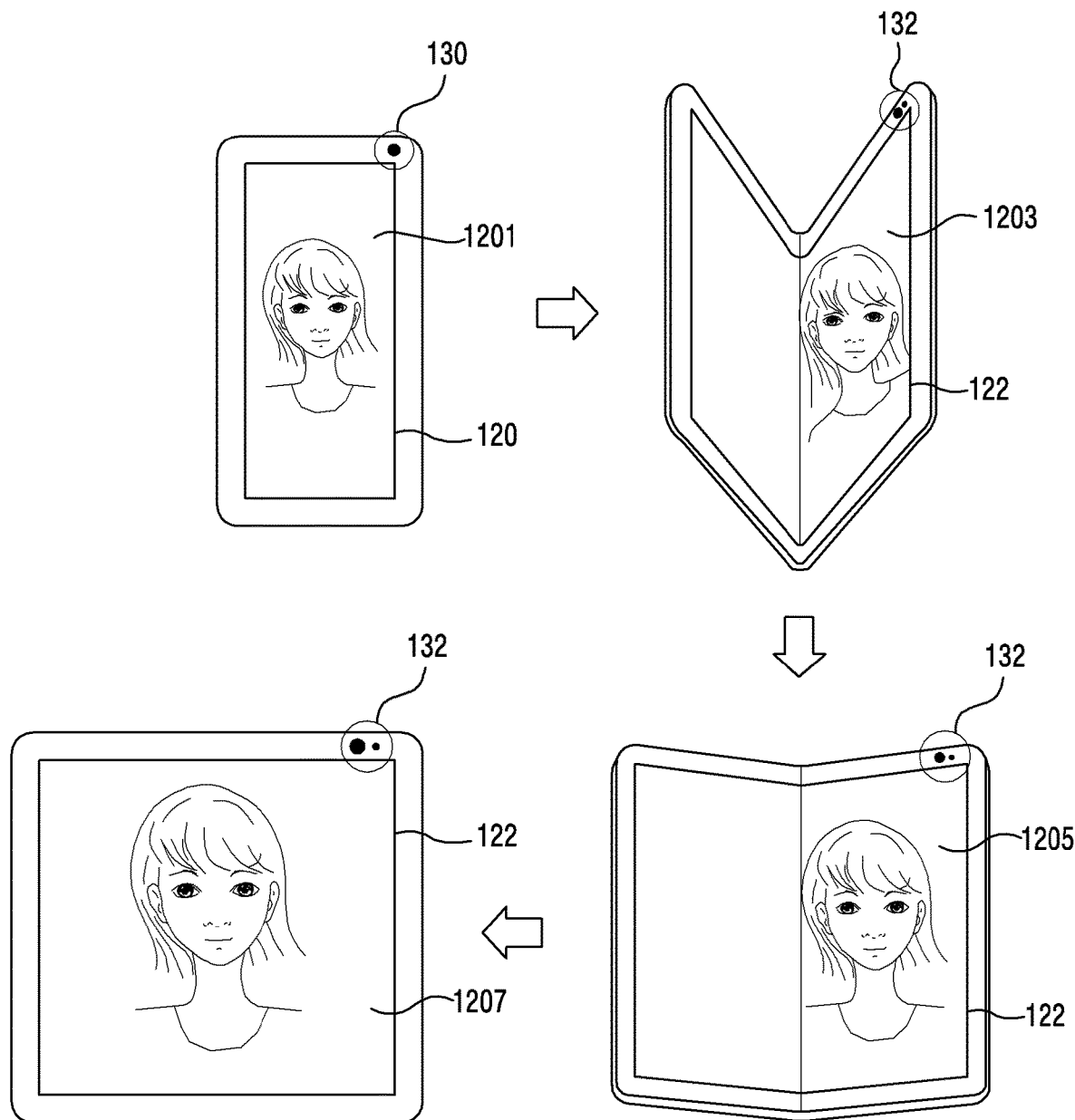
FIG. 12 is an illustration in which first sensor data is processed based on whether an object is sensed in an electronic device according to certain embodiments.

FIG. 11 is a flowchart illustrating use of data from a first sensor and/or a second sensor based on whether an object is sensed according to an angle change in an electronic device according to certain embodiments. The operations in FIG. 11, described below, may be at least some of the detailed operations of operations 305 and 307 in FIG. 3A. In embodiments below, the respective operations may be performed in sequence, but are not necessarily performed in sequence. For example, the orders of the respective operations may be changed, and at least two operations may be performed in parallel. Here, the electronic device may be the electronic device 101 in FIG. 1 and/or the electronic device 201 in FIG. 2. Hereinafter, at least some operations in FIG. 11 will be described with reference to FIG. 12. FIG. 12 is an illustration in which first sensor data is processed based on whether an object is sensed in an electronic device according to certain embodiments.

Referring to FIG. 11, an electronic device (e.g., the processor 220 in FIG. 2) according to certain embodiments may determine, in operation 1101, whether activation of at least one second sensor (e.g., the second sensor 132 in FIG. 1) has been completed. According to an embodiment, operation 1101 in FIG. 11 may include at least a part of operation 401 in FIG. 4. For example, as illustrated in FIG. 12, when an angle change, by which the mechanical state of the electronic device is changed from a closed state to a folded state (a partial open state), is sensed while image data 1201 acquired by the first sensor 130 is displayed on the first display 120 by using a camera application, the processor 220 may control the second sensor 132 to be activated.

According to certain embodiments, when the activation of the at least one second sensor 132 is completed, the electronic device (e.g., the processor 220) may determine, in operation 1103, whether an object identical to an object sensed by the first sensor 130 is sensed by the activated at least one second sensor 132. The processor 220 may determine, based on whether the object sensed by at least one first sensor 130 used before angle change sensing is sensed by the at least one second sensor 132 activated by the angle change sensing, whether valid data can be collected by using the at least one second sensor 132. For example, when an angle change is sensed while capturing an image of a user A by using the first sensor 130 in a state in which the electronic device 201 is closed, and when the activation of the second sensor 132 is completed by the angle change sensing, the processor 220 may analyze data collected by the second sensor 132 to determine whether the user A is sensed.

According to certain embodiments, when the at least one second sensor 132 is not activated, or when an object is not sensed by the activated at least one second sensor 132, the electronic device (e.g., the processor 220) may select and process, in operation 1105, data collected by the at least one first sensor 130 used before the angle change sensing. For example, when an object sensed by the at least one first sensor 130 before the angle change sensing is not sensed by the second sensor 132, the processor 220 may determine that valid data cannot be collected by using the at least one second sensor 132, and may use data collected by the first sensor as data for an application until a designated condition is satisfied (e.g., until the object is sensed by the second sensor 132). According to an embodiment, operation 1105 in FIG. 11 may include at least a part of operation 405 and operation 407 in FIG. 4.

According to certain embodiments, in operation 1107, the electronic device (e.g., the processor 220) may use the processed data as data for the application. According to an embodiment, operation 1107 in FIG. 11 may include at least a part of operation 409 in FIG. 4. For example, as illustrated in FIG. 12, when the activation of the second sensor 132 is not completed, or when an object is not sensed by the activated second sensor 132, the processor 220 may process image data collected by the first sensor 130 to adjust at least one among resolution, brightness, the size of an object, the position thereof, or a focus, and may control processed image data 1203 to be displayed on the second display 122.

According to certain embodiments, when an object is sensed by the activated at least one second sensor, the electronic device (e.g., the processor 220) may use, in operation 1109, data collected from the at least one second sensor 132 as data for the application. For example, as illustrated in FIG. 12, when the user A is sensed by the second sensor 132, the processor 220 may perform control such that image data 1205 or 1207 acquired by the second sensor 132 is displayed on the second display 122. According to an embodiment, operation 1109 in FIG. 11 may include at least a part of operation 411 in FIG. 4.

According to certain embodiments, in operation 1111, the electronic device (e.g., the processor 220) may perform a designated function, based on first data previously acquired from at least one sensor and second data acquired from at least one other sensor. For example, the designated function may be a function of generating third data by using the first data and the second data. In another example, the designated function may include at least one among a photographing function, a video recording function, a timer starting function for photographing and video recording, a graphic effect addition function, an object tracking function, or a focusing function. According to an embodiment, operation 1111 in FIG. 11 may include at least a part of operation 413 in FIG. 4.

Figure 13:
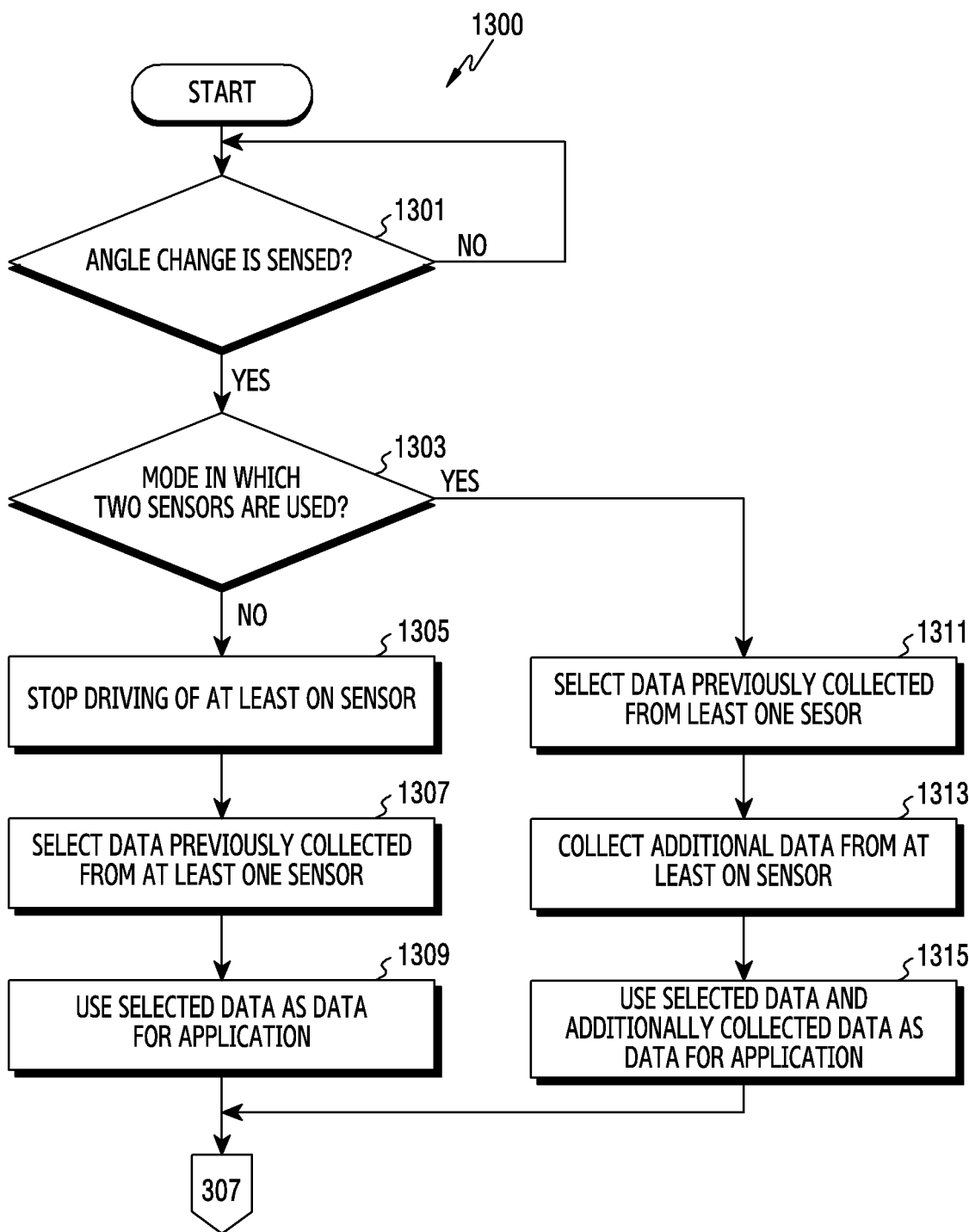
FIG. 13 is a flowchart illustrating controlling a first sensor according to an operation mode based on an angle change in an electronic device according to certain embodiments.
Figure 14:
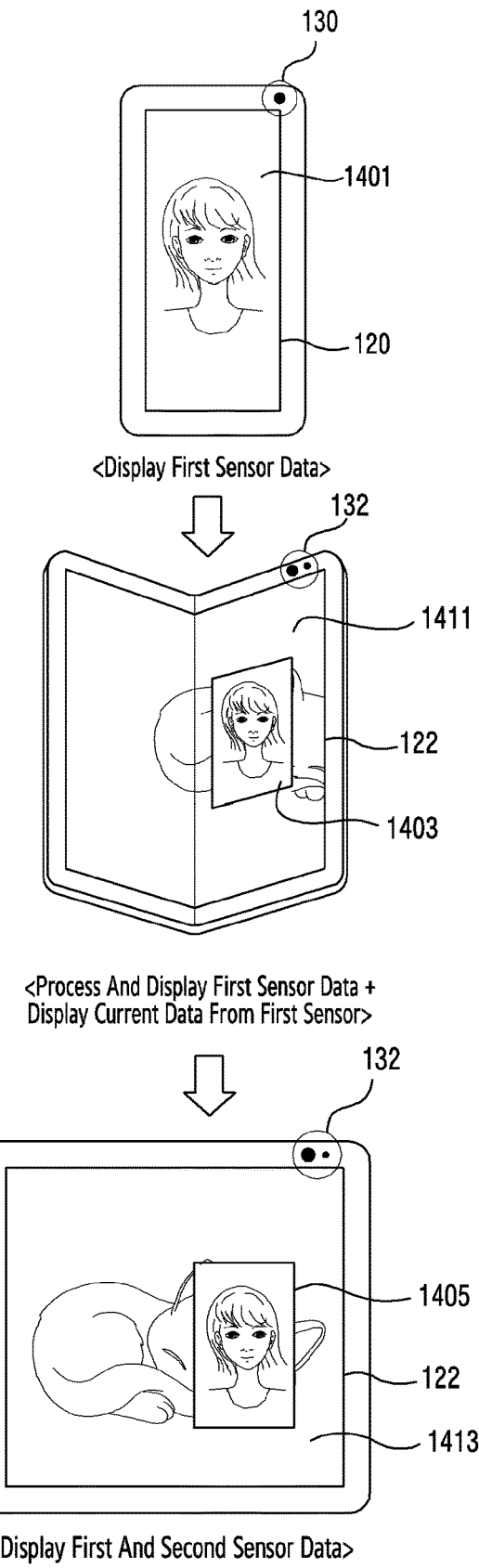
FIG. 14 is an illustration in which a first sensor is controlled according to an operation mode based on an angle change in an electronic device according to certain embodiments.

FIG. 13 is a flowchart illustrating controlling a first sensor according to an operation mode based on an angle change in an electronic device according to certain embodiments. The operations in FIG. 13, described below, may be at least some of the detailed operations of operations 301, 303, and 305 in FIG. 3A. In embodiments below, the respective operations may be performed in sequence, but are not necessarily performed in sequence. For example, the orders of the respective operations may be changed, and at least two operations may be performed in parallel. Here, the electronic device may be the electronic device 101 in FIG. 1 and/or the electronic device 201 in FIG. 2. Hereinafter, at least some operations in FIG. 13 will be described with reference to FIG. 14. FIG. 14 is an illustration in which a first sensor is controlled according to an operation mode based on an angle change in an electronic device according to certain embodiments.

Referring to FIG. 13, in operation 1301, an electronic device (e.g., the processor 220 in FIG. 2) according to certain embodiments may determine whether an angle change of the electronic device 201 (e.g., an angle formed by the first housing 112 and the second housing 114, the folding angle of the bendable second display 122 included in the electronic device 201, etc.) is sensed. According to an embodiment, operation 1301 may include at least a part of operation 301 in FIG. 3A. For example, as illustrated in FIG. 14, the processor 220 may determine whether the electronic device 210 changes from a closed state to a folded state (a partial open state), while performing control such that a preview screen of a camera application, including image data acquired from the first sensor 130 in the closed state, is displayed on the first display 120. According to certain embodiments, in operation 1303, the electronic device (e.g., the processor 220) may determine whether there is a need to enter a mode in which two sensors are used. The processor 220 may determine, based on at least one of the type of an application being executed or the function of the application, whether there is a need to enter a mode (e.g., a picture in picture (PIP) mode) in which two sensors are used. The mode in which two sensors are used may imply a mode in which sensors provided in different housings of the electronic device are simultaneously used. For example, the mode in which two sensors are used may imply a mode in which the first sensor 130, provided in the third surface of the first housing 112, and the second sensor 132, provided in the second surface of the second housing 114, are simultaneously used. According to certain embodiments, when there is no need to enter the mode in which two sensors are used, the electronic device (e.g., the processor 220) may stop driving of at least one first sensor 130 in operation 1305. According to an embodiment, the processor 220 may stop the driving of the at least one first sensor used before the angle change sensing, and may control the at least one second sensor 132 to be activated. For example, when an angle change is sensed while a video call application is executed by using data collected from the first sensor 130 (or data generated by the first sensor 130) in a closed state, the processor 220 may determine that there is no need to enter the mode in which two sensors are used, may stop the driving of the first sensor 130, and may control the second sensor 132 to be activated. Stopping the driving of the first sensor 130 may include an operation of changing the first sensor 130 from an activated state to a deactivated state. According to an embodiment, operation 1305 may include at least a part of operation 303 in FIG. 3A.

According to certain embodiments, in operation 1307, the electronic device (e.g., the processor 220) may select data previously collected from the at least one first sensor 130 (or data previously generated by the at least one first sensor 130). According to an embodiment, operation 1307 may include at least a part of operation 405 in FIG. 4.

According to certain embodiments, in operation 1309, the electronic device (e.g., the processor 220) may use the selected data as data for the application. According to an embodiment, operation 1307 may include at least a part of operations 407 and 409 in FIG. 4.

According to certain embodiments, when there is a need to enter the mode in which two sensors are used, the electronic device (e.g., the processor 220) may select, in operation 1311, data previously collected from the at least one first sensor 130 while maintaining the driving of the at least one first sensor 130 by entering the mode in which two sensors are used. The operation of selecting the data previously collected from the at least one first sensor 130 may include at least a part of operation 405 in FIG. 4.

According to certain embodiments, in operation 1313, the electronic device (e.g., the processor 220) may collect additional data from the at least one first sensor 130 (or may generate additional data by the at least one first sensor 130).

For example, the processor 220 may additionally generate data by the at least one first sensor 130 after the angle change of the electronic device 201 is sensed.

According to certain embodiments, in operation 1315, the electronic device (e.g., the processor 220) may use the selected data and the additionally generated data as data for the application. For example, the processor 220 may provide a user with third data by using first data generated by the first sensor 130 and second data generated by the second sensor 132. For example, the processor 220 may generate the third data including at least a part of the first data and at least a part of the second data, and may provide the generated third data. According to an embodiment, a part of the first data and a part of the second data may be synthesized or adjusted to be provided as the third data to user. According to an embodiment, the operation of processing the selected data and using the processed data as data for the application may include at least a part of operation 305 in FIG. 3A. For example, as illustrated in FIG. 14, the processor 220 may enter the mode in which two cameras are used, may provide, through the first display 120, a first image 1401 generated based on image information acquired from the first sensor 130 during the closed state, and may display, through the second display 122, a second image 1403 generated based on the first image 1401 within a designated angle, and third image data 1411 generated based on the image information acquired from the first sensor 130.

When the activation of the second sensor 132 is completed or the angle between the first surface 141 of the first housing 112 and the second surface 142 of the second housing 114 in the electronic device 201 satisfies the designated angle, or when the folding angle of the second display 122 satisfies the designated angle, the processor 220 may display fourth image data 1405, generated based on image information acquired from the second sensor 132, in at least a partial area of the second display 122, and may display fifth image data 1413, generated based on the image information acquired from the first sensor 130, in another area of the second display 122.

According to certain embodiments, a method for operating the electronic device 201 may include an operation of sensing a change in angle between a first housing (e.g., the first housing 112 in FIG. 1) and second housing (e.g., the second housing 114 in FIG. 1) of the electronic device, an operation of controlling the second sensor (e.g., the second sensor 132 in FIG. 1) to be activated in response to the angle change, an operation of using data collected from the first sensor 130 as data for an application until the activation of the second sensor 132 is completed, and an operation of using data collected from the second sensor 132 as data for the application when the activation of the second sensor 132 is completed.

According to an embodiment, in the method, the data collected from the first sensor 130 may include at least one among data collected from the first sensor 130 at the time of the angle change is sensed, data collected from the first sensor 130 before the angle change is sensed, or data collected from the first sensor 130 and stored before the angle change is sensed.

According to an embodiment, the operation configured to use data collected from the second sensor 132 as data for the application may include an operation of using, when the activation of the second sensor 1320 is sensed, the data collected from the first sensor 130 as data for the application until the angle of the first housing 112 and the second housing 114 satisfies a designated angle range.

According to an embodiment, the operation configured to use the data collected from the second sensor 132 as data for the application may include an operation of determining, when the activation of the second sensor 132 is sensed, whether the object is sensed by the second sensor, an operation of using, when an object sensed by the first sensor 130 is not sensed by the second sensor 132, the data collected from the first sensor 130 as data for the application until the object is sensed by the second sensor 132, and an operation of using the data collected from the second sensor 132 as data for the application when the object is sensed by the second sensor 132.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 240) including one or more instructions that are stored in a storage medium (e.g., internal memory 236 or external memory 238) that is readable by a machine (e.g., the electronic device 201). For example, a processor (e.g., the processor 220) of the machine (e.g., the electronic device 201) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
a first housing in which at least one first sensor is disposed;
a second housing in which at least one second sensor is disposed;
a connecting part for foldably coupling the first housing and the second housing;
a first display disposed in the first housing;
a second display disposed in the second housing, the second display extending to the first housing over to a folding part defined by the connecting part;
at least one sensor configured to detect an angle formed by the first housing and the second housing; and
a processor operatively connected to the first display, the second display, the at least one sensor, the first sensor, and the second sensor, wherein the processor is configured to:
use data collected from the first sensor for displaying on the first display;
detect a change in the angle, via the at least one sensor, between the first housing and the second housing, in response to the angle change, initiate an activation of the second sensor, use data collected from the first sensor for displaying on the second display until the activation of the second sensor is completed, and use data collected from the second sensor for displaying when the activation of the second sensor is completed.

2. The electronic device of claim 1, wherein the data collected from the first sensor includes at least one of data collected from the first sensor when the angle change is sensed, data collected from the first sensor before the angle change is sensed, or data collected from the first sensor and stored before the angle change is sensed.

3. The electronic device of claim 1, wherein the processor is configured to: when the activation of the second sensor is sensed, use the data collected from the first sensor to display an image representative of a particular application until the angle between the first housing and the second housing is within a designated angle range.

4. The electronic device of claim 1, wherein the processor is configured to:

determine, when the activation of the second sensor is sensed, whether an object detected by the first sensor is detected by the second sensor, when the object is not sensed by the second sensor, use the data collected from the first sensor to display an image representative of a particular application until the object is sensed by the second sensor, and use the data collected from the second sensor to display an image representative of the particular application when the object is sensed by the second sensor.

5. The electronic device of claim 1, wherein the processor is configured to:

before the angle change is detected, control a first image generated using the data collected from the first sensor for displaying on the first display, and after the angle change is detected, control a second image generated using the first image to be displayed on the second display.

6. The electronic device of claim 1, wherein the processor is configured to:

process the data collected from the first sensor, based on at least one of specification information of the first sensor, specification information of the second sensor, specification information of the first display, or specification information of the second display, and control the processed data to be displayed on the second display.

7. The electronic device of claim 1, further comprising a communication module, wherein the processor is configured to transmit the data collected from the first sensor or the second sensor or other data generated using the data collected from the first sensor to at least one other electronic device through the communication module.

8. The electronic device of claim 1, further comprising:

a communication module, wherein the processor is configured to:

when the angle change is a designated first angle, transmit the data collected from the first sensor or data generated by using the data collected from the first sensor to at least one other electronic device through the communication module, and when the angle change is a designated second angle, transmit the data collected from the second sensor to the at least one other electronic device through the communication module.

9. The electronic device of claim 1, wherein the processor is configured to control the first sensor to be deactivated in response to the angle change.

10. The electronic device of claim 1, wherein the processor is configured to when the activation of the second sensor is completed, compare the data collected from the first sensor with data collected from the activated second sensor, and perform at least one function based on the comparison outcome.

11. An electronic device comprising:

a first display;

a second display having a folding area;

a first camera positioned to capture images in a direction in which the first display faces;

a second camera positioned to capture images in a direction in which at least a portion of the second display faces; and a processor, wherein the processor is configured to:

in case a camera application is executed while a folding state associated with the electronic device corresponds to a first state, control the first display to display preview images generated based on image information acquired through the first camera, in case the folding state changes from the first state toward a second state while the camera application is being executed, start activation of the second camera, before the activation of the second camera is completed, control the second display to display at least one of the preview images generated based on image information acquired through the first camera, and based on the activation of the second camera being completed, control the second display to display preview images generated based on image information acquired through the second camera.

12. The electronic device of claim 11, wherein the processor is configured to, when the activation of the second camera is completed, control the second display to display the at least one of the preview images generated based on image information acquired through the first camera until the folding state satisfies a designated third state.

13. The electronic device of claim 11, wherein the processor is configured to, when the activation of the second camera is completed, control the second display to display the at least one of the preview images generated based on image information acquired through the first camera until an object sensed by the first camera is sensed by the second camera.

14. A method for operating an electronic device, comprising:

activating a first sensor to be activated;

sensing an angle change between a first housing and a second housing of the electronic device;

activating a second sensor in response to the angle change;

using data collected from the first sensor to display an image representative of a particular application until the activation of the second sensor is completed; and using data collected from the second sensor to display the image representative of the particular application when the activation of the second sensor is completed.

15. The method of claim 14, wherein the data collected from the first sensor includes at least one of data collected from the first sensor when the angle change is sensed, data collected from the first sensor before the angle change is sensed, or data collected from the first sensor and stored before the angle change is sensed.

16. The method of claim 14, wherein the activation of the second sensor is completed when the first housing and the second housing are aligned in a substantially horizontal orientation.

17. The method of claim 14, wherein displaying the image representative of the particular application based on the data collected from the second sensor when the activation of the second sensor is completed comprises enlarging the image displayed when the first housing and the second housing are aligned in a substantially horizontal orientation.

18. The method of claim 14, further comprising:
enlarging the image collected by the first sensor when the angle change between the first housing and the second housing reaches a predetermined angle, prior to using the data collected from the second sensor.

19. The method of claim 14, further comprising:
displaying the image collected by the first sensor when the angle change between the first housing and the second housing reaches a predetermined angle, before the first housing and the second housing are aligned in a substantially horizontal orientation.

20. The method of claim 19, further comprising:
displaying the image collected by the second sensor when the first housing and the second housing are aligned in a substantially horizontal orientation.

\* \* \* \* \*